United States Patent
Perni et al.

(10) Patent No.: US 12,454,516 B2
(45) Date of Patent: *Oct. 28, 2025

(54) NITRIC OXIDE RELEASING PRODRUGS OF MDA AND MDMA

(71) Applicant: EmpathBio, Inc., Encinitas, CA (US)

(72) Inventors: Robert B. Perni, Marlborough, MA (US); Glenn Short, Scituate, MA (US); Tanweer A. Khan, Bridgewater, NJ (US)

(73) Assignee: EmpathBio, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,035

(22) Filed: Jan. 29, 2024

(65) Prior Publication Data
US 2024/0400532 A1 Dec. 5, 2024

Related U.S. Application Data

(63) Continuation of application No. 18/147,189, filed on Dec. 28, 2022, now Pat. No. 11,912,680.

(60) Provisional application No. 63/294,225, filed on Dec. 28, 2021.

(51) Int. Cl.
C07D 307/79 (2006.01)
C07D 317/58 (2006.01)
C07D 319/18 (2006.01)

(52) U.S. Cl.
CPC ......... *C07D 317/58* (2013.01); *C07D 307/79* (2013.01); *C07D 319/18* (2013.01)

(58) Field of Classification Search
CPC .................................................. C07D 307/79
See application file for complete search history.

(56) References Cited

U.S. PATENT DOCUMENTS

| | | |
|---|---|---|
| 3,907,864 A | 9/1975 | Biel et al. |
| 4,017,636 A | 4/1977 | Jones et al. |
| 4,937,360 A | 6/1990 | Liu et al. |
| 5,061,727 A | 10/1991 | Bloom et al. |
| 5,932,749 A | 8/1999 | Li et al. |
| 6,436,950 B1 | 8/2002 | Achari et al. |
| 7,048,545 B2 | 5/2006 | McClusky |
| 9,878,992 B2 | 1/2018 | Bhamidipati et al. |
| 9,907,812 B2 | 3/2018 | Bapat et al. |
| 10,000,555 B2 | 6/2018 | Doronina et al. |
| 11,414,423 B1 | 8/2022 | Olson et al. |
| 11,845,736 B2 | 12/2023 | Rao et al. |
| 11,912,680 B2 * | 2/2024 | Perni ................ C07D 307/79 |
| 11,993,577 B2 | 5/2024 | Fawaz et al. |
| 12,221,428 B2 | 2/2025 | Cozzi et al. |

(Continued)

FOREIGN PATENT DOCUMENTS

| | | |
|---|---|---|
| AU | 2018268311 B2 | 2/2022 |
| CN | 101822841 A | 9/2010 |

(Continued)

OTHER PUBLICATIONS

Acquas. "Differential effects of intravenous R, S-(±)-3,4-methylenedioxymethamphetamine (MDMA, Ecstasy) and its S(+)-and R (-)-enantiomers on dopamine transmission and extracellular signal regulated kinase phosphorylation (pERK) in the rat nucleus accumbens shell and core", Journal of Neurochemistry (2007); 102(1): 121-132. doi: 10.1111/j.1471-4159.2007.04451.x.

Anderson et al., "Absolute configuration and psychotomimetic activity", 'QuaSAR' Research Monograph, National Institute on Drug Abuse (1978); 22: 8-15.

Angerer et al., "Acute psychotropic, autonomic, and endocrine effects of 5,6-methylenedioxy-2-aminoindane (MDAI) compared with 3,4-methylenedioxymethamphetamine (MDMA) in human volunteers: A self-administration study." Drug Test Anal. Sep. 2024; 16(9): 1002-1011. doi: 10.1002/dta.3622. Epub Dec. 6, 2023.

(Continued)

*Primary Examiner* — Matthew P Coughlin
(74) *Attorney, Agent, or Firm* — COOLEY LLP

(57) ABSTRACT

Provided herein are compounds of Formula (I), Formula (II), and Formula (III) or pharmaceutically acceptable salt thereof, wherein $R_1$, $R_2$, $R_3$, $R_4$, $R_5$, $R_6$, $R_7$ and A are defined herein. Also provided herein are pharmaceutical compositions comprising a compound of Formula (I), Formula (II), or Formula (III) and methods of using a compound of Formula (I), Formula (II), or Formula (II), e.g., in the treatment of a mental health disease or disorder.

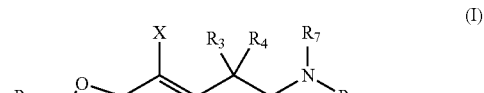

(I)

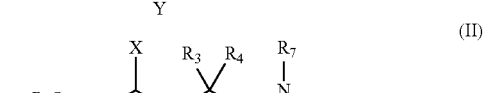

(II)

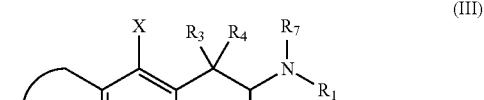

(III)

62 Claims, No Drawings

(56) References Cited

U.S. PATENT DOCUMENTS

| | | |
|---|---|---|
| 2003/0171303 A1 | 9/2003 | Gallop et al. |
| 2003/0207884 A1 | 11/2003 | Haap et al. |
| 2005/0130244 A1 | 6/2005 | Zheng et al. |
| 2006/0035863 A1 | 2/2006 | Barbeau |
| 2006/0205779 A1 | 9/2006 | Mu et al. |
| 2006/0205946 A1 | 9/2006 | Ji et al. |
| 2007/0027208 A1 | 2/2007 | Caron et al. |
| 2008/0045588 A1 | 2/2008 | Gant et al. |
| 2008/0146567 A1 | 6/2008 | Kolczewski et al. |
| 2008/0293695 A1 | 11/2008 | Bristol et al. |
| 2009/0111741 A1 | 4/2009 | Aldrich et al. |
| 2009/0131516 A1 | 5/2009 | Mickle et al. |
| 2009/0143408 A1 | 6/2009 | Eissenstat et al. |
| 2010/0137428 A1 | 6/2010 | Bozzoli et al. |
| 2013/0317020 A1 | 11/2013 | Ruah et al. |
| 2018/0243241 A1 | 8/2018 | Popp et al. |
| 2018/0344728 A1 | 12/2018 | Bosse et al. |
| 2020/0369707 A1 | 11/2020 | Verhoeven et al. |
| 2021/0113559 A1 | 4/2021 | Boss et al. |
| 2021/0145851 A1 | 5/2021 | Stamets |
| 2021/0332012 A1 | 10/2021 | Olson et al. |
| 2021/0346341 A1 | 11/2021 | Liechti |
| 2022/0151986 A1 | 5/2022 | Liechti et al. |
| 2022/0267252 A1 | 8/2022 | Trachsel et al. |
| 2022/0354822 A1 | 11/2022 | Barrow et al. |
| 2023/0097530 A1 | 3/2023 | Short et al. |
| 2023/0109467 A1 | 4/2023 | Anzalone et al. |
| 2023/0113351 A1 | 4/2023 | Blumstock et al. |
| 2023/0129723 A1 | 4/2023 | Short et al. |
| 2023/0227420 A1 | 7/2023 | Rao et al. |
| 2023/0278977 A1 | 9/2023 | Fawaz et al. |
| 2023/0310368 A1 | 10/2023 | Barrow et al. |
| 2024/0082212 A1 | 3/2024 | Short et al. |
| 2024/0208920 A1 | 6/2024 | Fawaz et al. |
| 2024/0217944 A1 | 7/2024 | Fawaz |
| 2024/0408054 A1 | 12/2024 | Short et al. |
| 2024/0425470 A1 | 12/2024 | Khan et al. |
| 2025/0026731 A1 | 1/2025 | Rao et al. |
| 2025/0152553 A1 | 5/2025 | Khan et al. |

FOREIGN PATENT DOCUMENTS

| | | | |
|---|---|---|---|
| CN | 110294789 A | 10/2019 | |
| DK | 3271357 T3 | 2/2020 | |
| EP | 2687854 A1 | 1/2014 | |
| NZ | 239929 A | 12/1994 | |
| WO | WO-2005038049 A2 | 4/2005 | |
| WO | WO-2007090733 A1 * | 8/2007 | ............ A61P 29/00 |
| WO | WO-2008033351 A2 | 3/2008 | |
| WO | WO-2008046135 A1 | 4/2008 | |
| WO | WO-2009049233 A1 | 4/2009 | |
| WO | WO-2009089494 A2 | 7/2009 | |
| WO | WO-2009095479 A2 | 8/2009 | |
| WO | WO-2012177986 A2 | 12/2012 | |
| WO | WO-2014013063 A1 | 1/2014 | |
| WO | WO-2016148306 A1 | 9/2016 | |
| WO | WO-2017147375 A1 | 8/2017 | |
| WO | WO-2018210988 A1 | 11/2018 | |
| WO | WO-2019018584 A1 | 1/2019 | |
| WO | WO-2020077217 A1 | 4/2020 | |
| WO | WO-2020101543 A1 | 5/2020 | |
| WO | WO-2020252384 A1 | 12/2020 | |
| WO | WO-2021252538 A2 | 12/2021 | |
| WO | WO-2022006192 A1 | 1/2022 | |
| WO | WO-2022010937 A1 | 1/2022 | |
| WO | WO-2022032147 A1 | 2/2022 | |
| WO | WO-2022053696 A1 | 3/2022 | |
| WO | WO-2022061242 A1 | 3/2022 | |
| WO | WO-2022069690 A2 | 4/2022 | |
| WO | WO-2022106947 A1 | 5/2022 | |
| WO | WO-2022150525 A1 | 7/2022 | |
| WO | WO-2022182602 A2 | 9/2022 | |
| WO | WO-2022232948 A1 | 11/2022 | |
| WO | WO-2022235530 A1 | 11/2022 | |
| WO | WO-2022251690 A1 | 12/2022 | |
| WO | WO-2022256720 A2 | 12/2022 | |
| WO | WO-2023283373 A1 | 1/2023 | |
| WO | WO-2023283386 A2 | 1/2023 | |
| WO | WO-2023019369 A1 | 2/2023 | |
| WO | WO-2023034510 A1 | 3/2023 | |
| WO | WO-2023044027 A1 | 3/2023 | |
| WO | WO-2023056102 A1 | 4/2023 | |
| WO | WO-2023056472 A1 | 4/2023 | |
| WO | WO-2023129958 A2 | 7/2023 | |
| WO | WO-2023131841 A1 | 7/2023 | |
| WO | WO-2023250247 A2 | 12/2023 | |
| WO | WO-2024052880 A1 | 3/2024 | |
| WO | WO-2024054279 A1 | 3/2024 | |
| WO | WO-2024102845 A2 | 5/2024 | |
| WO | WO-2024145663 A2 | 7/2024 | |
| WO | WO-2024148267 A1 | 7/2024 | |
| WO | WO-2024166057 A1 | 8/2024 | |
| WO | WO-2024166058 A1 | 8/2024 | |
| WO | WO-2024166059 A1 | 8/2024 | |
| WO | WO-2024254411 A2 | 12/2024 | |
| WO | WO-2024254505 A2 | 12/2024 | |
| WO | WO-2025010308 A2 | 1/2025 | |

OTHER PUBLICATIONS

Auvelity, (dextromethorphan HBr and bupropion HCl) extended-release tablets, Prescribing Information, Axsome Therapeutics, Inc., 2022. 19 pages.

Baker et al., "Critical evaluation of methodology commonly used in sample collection, storage and preparation for the analysis of pharmaceuticals and illicit drugs in surface water and wastewater by solid phase extraction and liquid chromatography-mass spectrometry." J Chromatogr A. Nov. 4, 2011;1218(44):8036-59. doi: 10.1016/j.chroma.2011.09.012. Epub Sep. 10, 2011, 61 pages.

Baker, et al., "Drugs of abuse in wastewater and suspended particulate matter—Further developments in sewage epidemiology." Environ Int. Nov. 1, 2012: 48: 28-38. doi: 10.1016/j.envint.2012.06.014. Epub Jul. 24, 2012.

Baker et al., "Multi-residue analysis of drugs of abuse in wastewater and surface water by solid-phase extraction and liquid chromatography-positive electrospray ionisation tandem mass spectrometry." J Chromatogr A. Mar. 25, 2011;1218(12):1620-31. doi: 10.1016/j.chroma.2011.01.060. Epub Jan. 28, 2011.

Baker, et al., "Multi-residue determination of the sorption of illicit drugs and pharmaceuticals to wastewater suspended particulate matter using pressurized liquid extraction, solid phase extraction and liquid chromatography coupled with tandem mass spectrometry." J Chromatogr A. Nov. 4, 2011; 1218(44): 7901-13. doi: 10.1016/j.chroma.2011.08.092. Epub Sep. 8, 2011.

Barreiro, J.C., et al., "A High-Resolution Magic Angle Spinning NMR Study of the Enantiodiscrimination of 3,4-Methylenedioxymethamphetamine (MDMA) by an Immobilized Polysaccharide-Based Chiral Phase", PLoS One, vol. 11, No. 9, Sep. 26, 2016, pp. 1-11.

Bartz, J., et al., "Oxytocin can hinder trust and cooperation in borderline personality disorder." Soc Cogn Affect Neurosci., Oct. 2011; 6(5): 556-63.

Battaglia et al., "Pharmacologic profile of MDMA (3,4-methylenedioxymethamphetamine) at various brain recognition sites." Eur J Pharmacol. Apr. 27, 1988; 149(1-2): 159-63. doi: 10.1016/0014-2999(88)90056-8.

Baumann et al., "Effects of dose and route of administration on pharmacokinetics of (+ or -)-3,4-methylenedioxymethamphetamine in the rat." Drug Metab Dispos. Nov. 2009; 37(11): 2163-70. doi: 10.1124/dmd.109.028506. Epub Aug. 13, 2009.

Berge et al., "Pharmaceutical salts." J Pharm Sci. Jan. 1977; 66(1): 1-19.

Biezonski et al., "Effects of a short-course MDMA binge on dopamine transporter binding and on levels of dopamine and its metabolites in adult male rats." Eur J Pharmacol. Feb. 15, 2013; 701(1-3): 176-80. doi: 10.1016/j.ejphar.2012.12.024. Epub Dec. 28, 2012.

(56) References Cited

OTHER PUBLICATIONS

Blanchard et al., "Ethoexperimental approaches to the biology of emotion." Annu Rev Psychol. 1988: 39: 43-68. doi: 10.1146/annurev.ps.39.020188.000355.
Bobes, J., "How is recovery from social anxiety disorder defined?" The Journal of Clinical Psychiatry. J Clin Psychiatry. 1998: 59 Suppl 17:12-19.
Brooks et al., "The significance of chirality in drug design and development." Curr Top Med Chem. 2011 ; 11 (7): 760-770. Author Manuscript, published Jan. 12, 2018 (Year: 2018).
Brøsen, K., et al., "Extensive Metabolizers of Debrisoquine Become Poor Metabolizers during Quinidine Treatment." Pharmacol Toxicol. Apr. 1987; 60(4): 312-4. doi: 10.1111/j.1600-0773.1987.tb01758.x.
Carbonaro, T. et al., "Double-blind comparison of the two hallucinogens psilocybin and dextromethorphan: similarities and differences in subjective experiences." Psychopharmacology (Berl). Feb. 2018; 235(2): 521-534. doi: 10.1007/s00213-017-4769-4. Epub Nov. 7, 2017.
Carhart-Harris et al., "Trial of psilocybin versus escitalopram for depression", New England Journal of Medicine (2021); 384(15): 1402-1411. doi: 10.1056/NEJMoa2032994.
Carhart-Harris, "Psilocybin for treatment-resistant depression: fMRI-measured brain mechanisms." Sci Rep. Oct. 13, 2017; 7(1): 13187. doi: 10.1038/s41598-017-13282-7. 11 pages.
Cascorbi, I., "Pharmacogenetics of cytochrome P4502D6: genetic background and clinical implication." Eur J Clin Invest. Nov. 2003: 33 (Suppl 2): 17-22. doi: 10.1046/j.1365-2362.33.s2.3.x.
Castrignano, et al., "Enantiomeric profiling of chiral drug biomarkers in wastewater with the usage of chiral liquid chromatography coupled with tandem mass spectrometry." J Chromatogr A. Mar. 18, 2016:1438:84-99. doi: 10.1016/j.chroma.2016.02.015. Epub Feb. 6, 2016.
Castrignano, et al., Enantiomeric profiling of chiral illicit drugs in a pan-European study, Water Res. Mar. 1, 2018: 130: 151-160. doi: 10.1016/j.watres.2017.11.051. Epub Dec. 1, 2017.
Chaly and Diksic, "High yield synthesis of 6-[18F]fluoro-L-dopa by regioselective fluorination of protected L-dopa with [18F]acetylhypofluorite." J Nucl Med. Dec. 1986; 27(12): 1896-901.
Chen, et al., "Investigation of the relationship between phenol ionization and affinity of norepinephrine for adrenergic receptors using ring-fluorinated analogs." Medicinal Chemistry Research, 1994, 3(9) pp. 589-597.
Chen, et al., "Syntheses of 2,5- and 2,6-difluoronorepinephrine, 2,5-difluoroepinephrine, and 2,6-difluorophenylephrine: effect of disubstitution with fluorine on adrenergic activity." J Med Chem. Nov. 26, 1993; 36(24): 3947-55. doi: 10.1021/jm00076a024.
Clinical Trials.gov., ID NCT03537014, "A Multi-site Phase 3 study of MDMA-Assisted Psychotherapy for PTSD (MAPP1)." National Library of Medicine, Sponsor Lykos Therapeutics, ((Aug. 18, 2021) Study Record Version 46) (Year: 2021), 32 pages.
ClinicalTrials.gov ID NCT05277636, "Acute Effects of R- and S-MDMA in Healthy Subjects (R-S-MDMA)." National Library of Medicine, Sponsor University Hospital, Basel, Switzerland, Study start, Oct. 1, 2022, 13 pages.
Clouting, H., "The Commercial Chemistry of MDMA: From Research to Patient Access," MAPS Bulletin Special Edition, Spring 2020, pp. 8-10.
Cohen, I., et al., "Concomitant drugs associated with increased mortality for MDMA users reported in a drug safety surveillance database." Scientific Reports, (2021) 11: 5997, 9 pages.
Collins et al., "Identification and characterization of N-tert-butoxycarbonyl-MDMA: a new MDMA precursor", Drug Testing and Analysis (Mar. 2017); 9(3): 399-404. doi: 10.1002/dta.2059. Epub Sep. 29, 2016.
Connarn et al., "Pharmacokinetics and Pharmacogenomics of Bupropion in Three Different Formulations with Different Release Kinetics in Healthy Human Volunteers." AAPS J. Sep. 2017; 19(5): 1513-1522. doi: 10.1208/s12248-017-0102-8. Epub Jul. 6, 2017.
Corkery et al., "Deaths in the Lesbian, Gay, Bisexual and Transgender United Kingdom Communities Associated with GHB and Precursors." Curr Drug Metab. 2018; 19(13): 1086-1099. doi: 10.2174/1389200218666171108163817.
Crean, R.D., et al., "Oral Administration of (±)3,4-Methylenedioxymethamphetamine and (+) Methamphetamine Alters Temperature and Activity in Rhesus Macaques", Pharmacol Biochem Behav, vol. 87, No. 1, Author Manuscript PMC May 1, 2008, pp. 1-18.
Crisp et al., "The antinociceptive effects of 3, 4-methylenedioxymethamphetamine (MDMA) in the rat", Pharmacology Biochemistry and Behavior (1989); 34(3): 497-501. doi: 10.1016/0091-3057(89)90547-9.
Curry. "Separating the agony from ecstasy: R(-)-3,4-methylenedioxymethamphetamine has prosocial and therapeutic-like effects without signs of neurotoxicity in mice", Neuropharmacology (2018); 128: 196-206. doi: 10.1016/j.neuropharm.2017.10.003. Epub Oct. 6, 2017. P.
Dalgleish, T., et al., "Transdiagnostic Approaches to Mental Health Problems: Current Status and Future Directions." Journal of Consulting and Clinical Psychology, 2020, vol. 88, No. 3, 179-195.
Danforth et al., "Reduction in social anxiety after MDMA-assisted psychotherapy with autistic adults: a randomized, double-blind, placebo-controlled pilot study." Psychopharmacology (2018) 235: 3137-3148 https:/ /doi.org/10.1007 /s00213-018-5010-9. 12 pages.
De La Torre and Farre, "Neurotoxicity of MDMA (ecstasy): the limitations of scaling from animals to humans." Trends Pharmacol Sci. Oct. 2004;25(10):505-8. doi: 10.1016/j.tips.2004.08.001., 4 pages.
De La Torre et al., "MDMA, methamphetamine, and CYP2D6 pharmacogenetics: what is clinically relevant?", Frontiers in Genetics (2012); 3: 235; 8 pages .doi: 10.3389/fgene.2012.00235.
De La Torre et al., "Non-linear pharmacokinetics of MDMA ('ecstasy') in humans." Br J Clin Pharmacol. Feb. 2000; 49(2): 104-9. doi: 10.1046/j. 1365-2125.2000.00121.x.
De Vos et al., "Psychedelics and Neuroplasticity: A Systematic Review Unraveling the Biological Underpinnings of Psychedelics." Front Psychiatry. Sep. 10, 2021: 12: 724606. doi: 10.3389/fpsyt.2021.724606. eCollection 2021.17 pages.
Deluca et al., "Searching the Internet for drug-related web sites: analysis of online available information on ecstasy (MDMA)." Am J Addict. Nov.-Dec. 2007; 16(6):479-83. doi: 10.1080/10550490701641181.
Doly et al., "Role of Serotonin via 5-HT2B Receptors in the Reinforcing Effects of MDMA in Mice." PLoS One. Nov. 23, 2009; 4(11): e7952. doi: 10.1371/journal.pone.0007952. 10 pages.
Duman et al., "Synaptic plasticity and depression: new insights from stress and rapid-acting antidepressants." Nat Med. Mar. 2016; 22(3): 238-49. doi: 10.1038/nm.4050.
Dunlap et al., "Dark classics in chemical neuroscience: 3, 4-methylenedioxymethamphetamine", ACS Chemical Neuroscience (2018); 9(10): 2408-2427. doi: 10.1021/acschemneuro.8b00155. Epub Jul. 12, 2018.
Eiden, et al., "VMAT2: a dynamic regulator of brain monoaminergic neuronal function interacting with drugs of abuse." Ann N Y Acad Sci. Jan. 2011: 1216: 86-98. doi: 10.1111/j.1749-6632.2010.05906.x.
Ellinwood Jr et al., "Fundamental mechanisms underlying altered behavior following chronic administration of psychomotor stimulants." Biological Psychiatry, Oct. 1, 1980, 15(5):749-757.
Erowid, "Like a Happy Smiley Speed MOMA, Escitalopram & Divalproex." May 29, 2021, Erowid.org Retrieved May 29, 2021. URL: https://www.erowid.org/experiences/exp.php?ID=89532. 6 pages.
Erowid, "Unexpectedly Hard Tripping . . . All Good, Too." Jul. 7, 2021, Erowid, Retrieved Jul. 7, 2021. URL:https://www.erowid.org/experiences/exp.php?ID=108919. 3 pages.
Eurofins SafetyScreen87 Panel, Panlabs, available online at https://www.eurofinsdiscovery.com/catalog/safetyscreen87-panel-tw/PP223, date unknown, document copyright date 2023, 4 pages.
Fallon et al., "Stereospecific Analysis and Enantiomeric Disposition of 3,4-Methylenedioxymethamphetamine (Ecstasy) in Humans," Clinical Chemistry (1999) 45:7, 1058-1069.

(56) References Cited

OTHER PUBLICATIONS

Fantegrossi et al., "3, 4-Methylenedioxymethamphetamine (MDMA, "ecstasy") and its stereoisomers as reinforcers in rhesus monkeys: serotonergic involvement." Psychopharmacology (Berl). Jun. 2002; 161(4):356-64. doi: 10.1007/s00213-002-1021-6. Epub Apr. 19, 2002.
Fantegrossi et al., "Serotonin synthesis inhibition reveals distinct mechanisms of action for MDMA and its enantiomers in the mouse", Psychopharmacology (2005); 181(3): 529-536. doi: 10.1007/s00213-005-0005-8. Epub Oct. 12, 2005.
Fantegrossi et al., "Nantenine: an antagonist of the behavioral and physiological effects of MDMA in mice." Psychopharmacology (2004) 173:270-277.
Fantegrossi et al., "Pharmacological characterization of the effects of 3, 4-methylenedioxymethamphetamine ("ecstasy") and its enantiomers on lethality, core temperature, and locomotor activity in singly housed and crowded mice", Psychopharmacology (2003); 166: 202-211. doi: 10.1007/s00213-002-1261-5. Epub Feb. 1, 2003.
Fantegrossi, "In vivo pharmacology of MDMA and its enantiomers in rhesus monkeys." Exp Clin Psychopharmacol. Feb. 2008; 16(1): 1-12. doi: 10.1037/1064-1297.16.1.1.
Feduccia, "MDMA-assisted psychotherapy for PTSD: Are memory reconsolidation and fear extinction underlying mechanisms?" Progress in Neuropsychopharmacology & Biological Psychiatry vol. 84, pp. 221-228, 2019.
Felim et al., "Synthesis and in Vitro Cytotoxicity Profile of the R-Enantiomer of 3,4-Dihydroxymethamphetamine (R-(-)-HHMA): Comparison with Related Catecholamines," Chem. Res. Toxicol. 2010, 23, 211-219.
Filler, R., "Fluorine-containing catecholamines. Synthesis of DL-2,5,6-trifluorodopa." Journal of fluorine chemistry, 1981, vol. 18(4), p. 483-495.
Fitzgerald et al., "Stereoselective pharmacokinetics of 3, 4-methylenedioxymethamphetamine in the rat." Chirality. 1990;2(4):241-8. doi: 10.1002/chir.530020409.
Forsling et al., "The effect of 3,4-methylenedioxymethamphetamine (MDMA, 'ecstasy') and its metabolites on neurohypophysial hormone release from the isolated rat hypothalamus." British Journal of Pharmacology (2002); 135(3): 649-656. doi: 10.1038/sj.bjp.0704502.
Frith et al., "Toxicity of methylenedioxymethamphetamine (MDMA) in the dog and the rat." Fundam Appl Toxicol. Jul. 1987; 9(1): 110-9. doi: 10.1016/0272-0590(87)90158-8.
Gauvin et al., "Establishing performance characteristics for positive control article selection in drug self-administration studies." Journal of Pharmacological and Toxicological Methods vol. 97, May-Jun. 2019, pp. 13-23.
Glue, P., et al., "Influence of CYP2D6 activity on the pharmacokinetics and pharmacodynamics of a single 20 mg dose of ibogaine in healthy volunteerst." J Clin Pharmacol. 2015. doi:10.1002/jcph.471. Epub Feb. 25, 2015. 20 pages.
Gold and Koob, "MDMA produces stimulant-like conditioned locomotor activity." Psychopharmacology (Berl). 1989; 99(3): 352-6. doi: 10.1007/BF00445556.
Gopisankar, M. G., "CYP2D6 pharmacogenomics." The Egyptian Journal of Medical Human Genetics 18 (2017) 309-313.
Green et al., "The pharmacology and clinical pharmacology of 3,4-methylenedioxymethamphetamine (MDMA, "ecstasy")", Pharmacol Rev, Sep. 2003; 55(3): 463-508. Epub Jul. 17, 2003.
Green, R., et al., "MDMA: on the translation from rodent to human dosing." Psychopharmacology (Berl). Jun. 2009; 204(2): 375-8. doi: 10.1007/s00213-008-1453-8. Epub Jan. 13, 2009.
Haberzettl et al., "Animal models of the serotonin syndrome: a systematic review." Behav Brain Res. Nov. 1, 2013: 256: 328-45. doi: 10.1016/j.bbr.2013.08.045. Epub Sep. 1, 2013.
Hagele et al., "Enantioselective separation of Novel Psychoactive Substances using a Lux® AMP 3 µm column and HPLC-UV." J Pharm Biomed Anal. Feb. 5, 2020;179:112967. doi: 10.1016/j.jpba.2019.112967. Epub Nov. 5, 2019. 2 pages.
Halberstadt and Geyer, "Characterization of the head-twitch response induced by hallucinogens in mice: detection of the behavior based on the dynamics of head movement," Psychopharmacology (Berl). Jun. 2013;227(4):727-39. doi: 10.1007/s00213-013-3006-z. Epub Feb. 14, 2013.
Halberstadt et al., "Correlation between the potency of hallucinogens in the mouse head-twitch response assay and their behavioral and subjective effects in other species." Neuropharmacology. May 1, 2020: 167: 107933. doi: 10.1016/j.neuropharm.2019.107933. Epub Jan. 7, 2020, 12 pages.
Han et al., "Comparison of the monoamine transporters from human and mouse in their sensitivities to psychostimulant drugs." BMC Pharmacol. Mar. 3, 2006: 6: 6. doi: 10.1186/1471-2210-6-6. 7 pages.
Heather, E., "The Synthesis and Chemical Profiling of 3,4-Methylenedioxymethamphetamine (MDMA) and Analogues," Thesis, University of Technology Sydney, Oct. 2020, 232 pages.
Hensley, et al., "Simultaneous determination of amphetamine, methamphetamine, methylenedioxyamphetamine (MDA), methylenedioxymethamphetamine (MDMA), and methylenedioxyethylamphetamine (MDEA) enantiomers by GC-MS." Journal of Analytical Toxicology, Oct. 1999, pp. 518-523.
Herr et al., "Re-evaluation of the discriminative stimulus effects of lysergic acid diethylamide with male and female Sprague-Dawley rats." Behav Pharmacol. Dec. 2020; 31(8): 776-786.
Heydari, A., et al., "Mechanism-based inactivation of CYP2D6 by methylenedioxymethamphetamine." Drug Metab Dispos. Nov. 2004; 32(11): 1213-7. doi: 10.1124/dmd.104.001180. Epub Aug. 24, 2004.
Hilaire et al., "The role of serotonin in respiratory function and dysfunction." Respiratory Physiology & Neurobiology vol. 174, Issues 1-2, Nov. 30, 2010, pp. 76-88.
Hiramatsu et al., "Enantiomeric differences in the effects of 3, 4-methylenedioxymethamphetamine on extracellular monoamines and metabolites in the striatum of freely-moving rats: an in vivo microdialysis study", Neuropharmacology (1990); 29(3): 269-275. doi: 10.1016/0028-3908(90)90012-g.
Holze et al., "Distinct acute effects of LSD, MDMA, and D-amphetamine in healthy subjects", Neuropsychopharmacology (2020); 45(3): 462-471. doi: 10.1038/s41386-019-0569-3. Epub Nov. 16, 2019.
Huot et al., "Characterization of 3,4-Methylenedioxymethamphetamine (MDMA) Enantiomers In Vitro and in the MPTP-Lesioned Primate: R-MDMA Reduces Severity of Dyskinesia, Whereas S-MDMA Extends Duration of ON-Time", The Journal of Neuroscience (May 11, 2011); 31(19): 7190-7198. doi: 10.1523/JNEUROSCI.1171-11.2011.
Hysek et al., "Duloxetine inhibits effects of MDMA ("ecstasy") in vitro and in humans in a randomized placebo-controlled laboratory study", PloS One (2012); 7(5): e36476; 15 pages. doi: 10.1371/journal.pone.0036476. Epub May 4, 2012.
Hysek et al., "Effects of the α2-adrenergic agonist clonidine on the pharmacodynamics and pharmacokinetics of 3,4-methylenedioxymethamphetamine in healthy volunteers", The Journal of Pharmacology and Experimental Therapeutics (2012); 340: 286-294. doi: 10.1124/jpet.111.188425. Epub Oct. 27, 2011.
Hysek et al., "MDMA enhances emotional empathy and prosocial behavior." Soc Cogn Affect Neurosci. Nov. 2014; 9(11): 1645-52. doi: 10.1093/scan/nst161. Epub Oct. 4, 2013.
Hysek et al., "The norepinephrine transporter inhibitor reboxetine reduces stimulant effects of MOMA ("ecstasy") in humans", Clinical Pharmacology and Therapeutics (2011); 90: 246-255. doi: 10.1038/clpt.2011.78. Epub Jun. 15, 2011.
Inouye et al., "MDMA-assisted therapy for borderline personality disorder." Journal of Psychedelic Studies, 7 (2023) 3, 227-237, DOI:10.1556/2054.2023.00196.
International Preliminary Report on Patentability for International Application No. PCT/IB2023/058939 mailed Mar. 20, 2025, 8 pages.
International Preliminary Report on Patentability for International Application No. PCT/US2022/042353 dated Nov. 7, 2023, 27 pages.

(56) References Cited

OTHER PUBLICATIONS

International Preliminary Report on Patentability for International Application No. PCT/US2022/043833 dated Mar. 28, 2024, 5 pages.
International Preliminary Report on Patentability for International Application No. PCT/US2022/045587 dated Apr. 11, 2024, 11 pages.
International Preliminary Report on Patentability for International Application No. PCT/US2022/077432 dated Apr. 11, 2024, 9 pages.
International Preliminary Report on Patentability for International Application No. PCT/US2023/079137 mailed May 22, 2025, 9 pages.
International Search Report and Written Opinion for International Application No. PCT/IB2023/058939 dated Dec. 1, 2023, 11 pages.
International Search Report and Written Opinion for International Application No. PCT/US2022/042353, mailed on Dec. 8, 2022, 9 pages.
International Search Report and Written Opinion for International Application No. PCT/US2022/043833 dated Jan. 12, 2023, 13 pages.
International Search Report and Written Opinion for International Application No. PCT/US2022/045587 dated Feb. 1, 2023, 25 pages.
International Search Report and Written Opinion for International Application No. PCT/US2022/077432 dated Dec. 15, 2022, 14 pages.
International Search Report and Written Opinion for International Application No. PCT/US2022/082468, mailed on Jun. 6, 2023, 11 pages.
International Search Report and Written Opinion for International Application No. PCT/US2023/079137 dated Apr. 29, 2024, 11 pages.
International Search Report and Written Opinion for International Application No. PCT/US2023/086567, dated May 24, 2024, 11 pages.
International Search Report and Written Opinion for International Application No. PCT/US2024/010486 mailed May 17, 2024. 10 pages.
International Search Report and Written Opinion for International Application No. PCT/US2024/032949, mailed Nov. 26, 2024. 11 pages.
International Search Report and Written Opinion for International Application No. PCT/US2024/033081, dated Oct. 24, 2024, 14 pages.
International Search Report and Written Opinion for International Application No. PCT/US2024/036639, mailed Sep. 23, 2024, 11 pages.
International Search Report and Written Opinion for International Application No. PCT/US2024/054056, mailed Feb. 10, 2025, 18 pages.
International Search Report and Written Opinion for International Application No. PCT/US2024/061447, mailed Feb. 26, 2025, 10 pages.
Invitation to Pay Additional Fees for International Application No. PCT/US2023/086567, mailed Mar. 18, 2024. 2 pages.
Invitation to Pay Additional Fees for International Application No. PCT/US2024/010486 mailed Mar. 12, 2024, 2 pages.
Invitation to Pay Additional Fees for International Application No. PCT/US2024/032949, mailed Aug. 6, 2024, 2 pages.
Invitation to Pay Additional Fees for International Application No. PCT/US2024/033081, mailed Aug. 15, 2024, 3 pages.
Invitation to Pay Fee for International Application No. PCT/US2022/045587 dated Nov. 18, 2022, 3 pages.
Invitation to Pay for International Application No. PCT/US2022/082468 dated Mar. 16, 2023, 2 pages.
Jeppesen, U., et al., "Dose-dependent inhibition of CYP1A2, CYP2C19 and CYP2D6 by citalopram, fluoxetine, fluvoxamine and paroxetine." Eur J Clin Pharmacol (1996) 51: 73-78.
Johnson et al., "Effects of enantiomers of MDA, MDMA and related analogues on [3H] serotonin and [3H] dopamine release from superfused rat brain slices." Eur J Pharmacol. Dec. 16, 1986;132(2-3):269-76. doi: 10.1016/0014-2999(86)90615-1.
Kalant, Harold, "The pharmacology and toxicology of "ecstasy" (MDMA) and related drugs." CMAJ. Oct. 2, 2001; 165(7): 917-28.
Kalivas et al., "MDMA Elicits Behavioral and Neurochemical Sensitization in Rats." Neuropsychopharmacology vol. 18, pp. 469-479 (1998).
Kamilar-Britt and Bedi, "The prosocial effects of 3,4-methylenedioxymethamphetamine (MDMA): Controlled studies in humans and laboratory animals." Neurosci Biobehav Rev. Oct. 2015: 57: 433-46. doi: 10.1016/j.neubiorev.2015.08.016. Epub Sep. 25, 2015.
Kashdan, T. B. & Mcknight, P. E., "The darker side of social anxiety: When aggressive impulsivity prevails over shy inhibition." Current Directions in Psychological Science. Feb. 2010;19(1):47-50.
Kilpatrick et al., "National estimates of exposure to traumatic events and PTSD prevalence using DSM-IV and DSM-5 criteria." J Trauma Stress. Oct. 2013;26(5):537-47. doi: 10.1002/jts.21848.
Kirilly, E, et al., "Acute and long-term effects of a single dose of MDMA on aggression in Dark Agouti rats." Int J Neuropsychopharmacol. Feb. 2006; 9(1): 63-76.
Kiyatkin, "Environmental Conditions Modulate Neurotoxic Effects of Psycho motor Stimulant Drugs of Abuse." Int Rev Neurobiol. 2012 ; 102: 147-171. doi:10.1016/B978-0-12-386986-9.00006-5.
Koenig and Hilber, "The Anti-Addiction Drug Ibogaine and the Heart: A Delicate Relation." Molecules 2015, 20, 2208-2228; doi:10.3390/molecules20022208.
Kolbrich et al., "Physiological and subjective responses to controlled oral 3, 4-methylenedioxymethamphetamine administration", Journal of Clinical Psychopharmacology (2008); 28(4): 432-440. doi: 10.1097/JCP.0b013e31817ef470.
Kotlyar et al., "Inhibition of CYP2D6 Activity by Bupropion." J Clin Psychopharmacol. Jun. 2005; 25(3): 226-9. doi: 10.1097/01.jcp.0000162805.46453.e3.
Kozma, D., et al., "Optical resolution of N-methylamphetamine via diastereoisomeric salt formation with 2R,3R-O,O'-di-p-toluoyltartaric acid," Chirality, 1999, vol. 11, Issue 5-6, pp. 373-375.
Ladd, et al., Improved synthesis of fluoroveratroles and fluorophenethylamines via organolithium reagents, Journal of Organic Chemistry, 1981, pp. 203-206.
Leapman, et al., Application of parallel recorded EELS to analysis of beam-sensitive organic compounds, Biomed. Eng. Instrum., Proceedings—Annual Meeting, Electron Microscopy Society of America, 1988, pp. 632-633.
Leapman, et al., Applications of electron energy loss spectroscopy in biology: detection of calcium and fluorine, Proceedings—Annual Meeting, Electron Microscopy Society of America, 1982, pp. 412-415.
Lettfuss et al. "Is behavioral sensitization to 3,4-methylenedioxymethamphetamine (MDMA) mediated in part by cholinergic receptors?" Behav Brain Res. May 1, 2013: 244: 116-9. doi: 10.1016/j.bbr.2013.01.033. Epub Feb. 1, 2013.
Levine et al. (editor), "Principles of Forensic Toxicology," Springer, Fifth Edition, 2020, 680 pages.
Lewis et al., "Synthesis of R-and S-MDMA via nucleophilic ring-opening of homochiral N- tosylaziridines", Jul. 12, 2023 (Jul. 12, 2023), Australian Journal of Chemistry, 76(5), pp. 299-310.
Lourenco et al., Chiral separation of 3, 4-methylenedioxymethamphetamine (MDMA) enantiomers using batch chromatography with peak shaving recycling and its effects on oxidative stress status in rat liver, Journal of Pharmaceutical and Biomedical Analysis, Jan. 2013, pp. 13-17.
Ly et al., "Psychedelics promote structural and functional neural plasticity." Cell Rep. Jun. 12, 2018; 23(11): 3170-3182. doi: 10.1016/j.celrep.2018.05.022.
Lyon et al., "3, 4-Methylenedioxymethamphetamine (MDMA): stereoselective interactions at brain $5\text{-HT}_1$ and $5\text{-HT}_2$ receptors." Psychopharmacology (1986); 88: 525-526. doi: 10.1007/BF00178519.

(56) References Cited

OTHER PUBLICATIONS

Madry, et al., Evaluation of drug incorporation into hair segments and nails by enantiomeric analysis following controlled single MDMA intakes, Analytical and Bioanalytical Chemistry, Jan. 2016, pp. 545-556.

Madsen et al., "A single psilocybin dose is associated with long-term increased mindfulness, preceded by a proportional change in neocortical 5-HT2A receptor binding." Eur Neuropsychopharmacol. Apr. 2020: 33: 71-80. doi: 10.1016/j.euroneuro.2020.02.001. Epub Mar. 4, 2020.

Martins, et al., Simultaneous enantioselective determination of amphetamine and congeners in hair specimens by negative chemical ionization gas chromatography-mass spectrometry, Journal of Chromatography B, Oct. 15, 2005, pp. 57-62.

Martins, et al., "Time-resolved hair analysis of MDMA enantiomers by GC/MS-NCI." Forensic Sci Int. Oct. 25, 2007;172(2-3):150-5. doi: 10.1016/j.forsciint.2007.01.008. Epub Feb. 14, 2007.

Mas et al., "Cardiovascular and neuroendocrine effects and pharmacokinetics of 3, 4-methylenedioxymethamphetamine in humans." J Pharmacol Exp Ther. Jul. 1999;290(1):136-45.

Matsushima et al., "Optical isomer analysis of 3, 4-methylenedioxyamphetamine analogues and their stereoselective disposition in rats." J Anal Toxicol. Jan.-Feb. 1998;22(1):33-9. doi: 10.1093/jat/22.1.33.

McEwen et al., "Stress Effects on Neuronal Structure: Hippocampus, Amygdala, and Prefrontal Cortex." Neuropsychopharmacology. Jan. 2016; 41(1): 3-23. doi: 10.1038/npp.2015.171. Epub Jun. 16, 2015.

Miczek, K., "A new test for aggression in rats without aversive stimulation: Differential effects of d-amphetamine and cocaine." Psychopharmacology (Berl). Feb. 28, 1979; 60(3): 253-9. doi: 10.1007/BF00426664.

Miksys, et al., "Human CYP2D6 and mouse CYP2Ds: organ distribution in a humanized mouse model." Drug Metab Dispos. Oct. 2005; 33(10): 1495-502. doi: 10.1124/dmd.105.005488. Epub Jul. 20, 2005.

Milhazes, et al., Electrochemical and spectroscopic characterisation of amphetamine-like drugs: Application to the screening of 3,4-methylenedioxymethamphetamine (MDMA) and its synthetic precursors, Analytica Chimica Acta, 2007, pp. 231-241.

Mitchell. "MDMA-assisted therapy for severe PTSD: a randomized, double-blind, placebo-controlled phase 3 study", Nature Medicine (2021); 27(6):1025-1033. doi: 10.1038/s41591-021-01336-3. Epub May 10, 2021.

Mithoefer et al., "The safety and efficacy of {+/−}3,4-methylenedioxymethamphetamine-assisted psychotherapy in subjects with chronic, treatment-resistant posttraumatic stress disorder: the first randomized controlled pilot study." J Psychopharmacol. Apr. 2011; 25(4): 439-52. doi: 10.1177/0269881110378371. Epub Jul. 19, 2010.

Multidisciplinary Association for Psychedelic Studies (MAPS), "A Manual for Adherence Ratings of MDMA-Assisted Therapy for Treatment of Posttraumatic Stress Disorder, Version 6." MAPS, Santa Cruz, CA, Aug. 2021, 52 pages.

Murnane, et al., Discriminative stimulus effects of psychostimulants and hallucinogens in S (+)-3, 4-methylenedioxymethamphetamine (MDMA) and R (−)-MDMA trained mice, Journal of Pharmacology and Experimental Therapeutics, Nov. 1, 2009, pp. 717-723.

Murnane et al., "Endocrine and neurochemical effects of 3, 4-methylenedioxymethamphetamine and its stereoisomers in rhesus monkeys", Journal of Pharmacology and Experimental Therapeutics (2010); 334(2): 642-650. doi: 10.1124/jpet.110.166595. Epub May 13, 2010.

Murnane, et al., "The neuropharmacology of prolactin secretion elicited by 3, 4-methylenedioxymethamphetamine ("ecstasy"): a concurrent microdialysis and plasma analysis study." Horm Behav. Feb. 2012; 61(2): 181-90. doi: 10.1016/j.yhbeh.2011.10.012. Epub Dec. 14, 2011.

Mustafa, et al., Review Paper: MDMA and the Brain: A Short Review on the Role of Neurotransmitters in Neurotoxicity, Basic and Clinical Neuroscience, 2020, pp. 381-388.

Nair et al., "Fully validated, multi-kilogram cGMP synthesis of Mdma", ACS Omega (2021); 7(1): 900-907. doi: 10.1021/acsomega. 1c05520.

Nash et al., "Effect of the R (−) and S (+) isomers of MDA and MDMA on phosphotidyl inositol turnover in cultured cells expressing 5-HT2A or 5-HT2C receptors", Neuroscience Letters (1994); 177(1-2): 111-115. doi: 10.1016/0304-3940(94)90057-4.

National Center for Biotechnology Information, "1-(1,3-benzodioxol-5-yl)-N ,3-dimethylbuta n-2-amine; hydrochloride: Pubchem CID 90667266" Pubchem entry (online), pp. 1-9, Mar. 11, 2015; Retrieved on Dec. 2, 2024 from the Internet: [URL: https://pubc hem.ncbi. nlm.nih.gov/compound/90667266].

National Center for Biotechnology Information, "[1-[2-(3,4-Dimethoxyphenyl)ethyl] cycloprop yl] carbamic acid: Pubchem CID 150096163" Pubchem entry (online), pp. 1-7, Dec. 13, 2018; Retrieved on Dec. 2, 2024 from the Internet: [URL: https://pubche m.ncbi.nlm.nih.gov/compound/150096163].

National Center for Biotechnology Information, "[1-[(3,4-Dimethoxyphenyl)methyl] cyclobutyl] carbamic acid: Pubchem CID 135313815" Pubchem entry (online), pp. 1-8, Dec. 15, 2018; Retrieved on Dec. 2, 2024 from the Internet: [URL: https://pubchem .ncbi.nlm.nih.gov/compound/135313815].

National Center for Biotechnology Information, "[2-(I,3-Benzodioxol-5-yl)-2-methylpropyl] carbamic acid: Pubchem CID 115171385" Pubchem entry (online), pp. 1-7, Jan. 29, 2016; Retrieved on Dec. 2, 2024 from the Internet: [URL: https://pubchem.ncbi .nlm.nih. gov/compound/115171385].

National Center for Biotechnology Information "2-(I,3-benzodioxol-5-yl)ethyl carbamothio ic S-acid: Pubchem CID 115170245" Pubchem entry (online), pp. 1-7, Jan. 29, 2016; Retrieved on Dec. 1, 2024 from the Internet: [URL: https://pubchem.ncbi.nlm.nih.gov/ compound/ 115170245].

National Center for Biotechnology Information, "Ethyl (2S)-3-(1,3-benzodioxol-5-yl)-2-[(2-methylpropan-2-yl)oxycarbonylamino] propanoate: Pubchem CID 57958894" Pubchem entry (online), pp. 1-9, Aug. 19, 2012; Retrieved on Dec. 2, 2024 from the Internet: [URL: https://pubchem.ncbi.nlm.nih.gov/compound/57958894].

National Center for Biotechnology Information, "Ethyl N-[1-chloro-2-(3,4-dimethoxyphenyl) ethyl]carbamate: Pubchem CID 89487151" Pubchem entry (online), pp. 1-8, Feb. 13, 2015; Retrieved on Dec. 2, 2024 from the Internet: [URL: https://pubchem.nc bi.nlm.nih. gov/compound/89487151].

National Center for Biotechnology Information, "Ethyl N-[2-(I,3-benzodioxol-5-yl)ethyl] carbamate: Pubchem CID 15229637" Pubchem entry (online), pp. 1-9, Feb. 9, 2007; Retrieved on Dec. 1, 2024 from the Internet: [URL: https://pubchem.ncbi.nlm. nih.gov/compound/ 15229637].

National Center for Biotechnology Information, "Mbdp hydrochloride: Pubchem CID 90667265" Pubchem entry (online), pp. 1-10, Mar. 11, 2015; Retrieved on Dec. 2, 2024 from the Internet: [URL: https://pubchem.ncbi.nlm.nih.gov/compound/90667265].

National Center for Biotechnology Information, "Methyl N-[2-(1 ,3-benzodioxol-5-yl) ethyl]carbamodithioate: Pubchem CID 44125045" Pubchem entry (online), pp. 1-8, Jul. 27, 2009; Retrieved on Dec. 1, 2024 [URL: https://pubchem.ncbi.nlm.nih.gov/compound/ 44125045].

National Center for Biotechnology Information, "Methyl N-[(2R)-I-(I,3-benzodioxol-5-yl)-3 -chloropropan-2-yl]carbamate: Pubchem CID 166107066" Pubchem entry (online), pp. 1-7, Dec. 20, 2022; Retrieved on Dec. 2, 2024 from the Internet: [URL: https:// pubchem. ncbi.nlm.nih.gov/compound/166107066].

National Center for Biotechnology Information, "Methyl N-[I-(I , 3-benzodioxol-5-yl) propan- 2-yl]carbamate: Pubchem CID 168188536" Pubchem entry (online), pp. 1-9, May 30, 2023; Retrieved on Dec. 1, 2024 from the Internet: [URL: https://pubchem.ncbi.n lm.nih. gov/compound/168188536].

National Center for Biotechnology Information, N-Methyl-1-(3,4-methylenedioxyphenyl)- 2-butananiine: Pubchem CID 124844 Pubchem

(56) References Cited

OTHER PUBLICATIONS entry (online), pp. 1-8, Jul. 19, 2005; Retrieved on Dec. 2, 2024 from the Internet: [URL: https://pubchem.ncbi.nlm.nih.gov/ compound/124844].
National Center for Biotechnology Information, N-Moc-MDMA: Pubchem CID 165361551 Pubchem entry (online), pp. 1-11, Oct. 11, 2022; Retrieved on Dec. 2, 2024 from the Internet: [URL: https://pubchem.ncbi.nlm.nih.gov/compound/165361 551].
National Center for Biotechnology Infonnation, "Methyl N-[(2S)-1-(1,3-benzodioxol-5-yl)-3 -chloropropan-2-yl]carbamate: Pubchem CID 166107086" Pubchem entry (online), pp. 1-7, Dec. 20, 2022; Retrieved on Dec. 2, 2024 from the Internet: [URL: https:// pubchem.ncbi.nlm.nih.gov/compound/166107086].
National Center for Biotechnology Information, "Methyl N-[4-(3,4-dimethoxyphenyl) oxan-4- yl]carbamate: Pubchem CID 142770320" Pubchem entry (online), pp. 1-8, Dec. 7, 2019; Retrieved on Dec. 2, 2024 from the Internet: [URL: https://pubchem.ncbi.nlm.nih.gov/compound/142770320].
Navarro and Maldonado, "Behavioral profile of 3,4-methylenedioxymethamphetamine (MDMA) in agonistic encounters between male mice." Prog Neuropsychopharmacol Biol Psychiatry. Feb. 1999; 23(2): 327-34. doi: 10.1016/s0278-5846(98)00100-6.
Navarro and Maldonado, "Effects of acute, subchronic and intermittent MDMA ('Ecstasy') administration on agonistic interactions between male mice." Aggressive Behavior (2004) vol. 30, Issue 1, p. 84-91.
Nelson and Chiavegatto, "Molecular basis of aggression." Trends Neurosci. Dec. 2001; 24(12): 713-9. doi: 10.1016/s0166-2236(00)01996-2.
Nenajdenko et al., "A new convenient approach to chiral β-aryl (heteroaryl) alkylamines", Tetrahedron: Asymmetry (2001); 12(18): 2517-2527.
Neumann et al., "Aggression and anxiety: social context and neurobiological links, Front Behav Neurosci." Mar. 30, 2010: 4: 12. doi: 10.3389/fnbeh.2010.00012. eCollection 2010, 16 pages.
Nichols et al., "Derivatives of 1-(1, 3-benzodioxol-5-yl)-2-butanamine: representatives of a novel therapeutic class", Journal of Medicinal Chemistry (1986); 29(10): 2009-2015. doi: 10.1021/jm00160a035.
Nie, et al., "Synthesis of fluorodopamines: effect of aryl fluoro substituents on affinities for adrenergic and dopaminergic receptors." Medicinal Chemistry Research, Jan. 1996, pp. 318-332.
O'Mathuna, B., et al., "The Consequences of 3,4-Methylenedioxymethamphetamine Induced CYP2D6 Inhibition in Humans." J Clin Psychopharmacol. Oct. 2008; 28(5): 523-9. doi: 10.1097/JCP.0b013e318184ff6e.
Organic Chemistry Portal, Amino Protecting Groups, Stability, available online at: https://www.organic-chemistry.org/protectivegroups/amino.shtm, 1999, pp. 1-3.
Parrot, A C, "Is ecstasy Mdma? A review of the proportion of ecstasy tablets containing MDMA, their dosage levels, and the changing perceptions of purity." Psychopharmacology (Berl). May 2004; 173(3-4): 234-41. doi: 10.1007/s00213-003-1712-7. Epub Mar. 9, 2004.
Parrott AC, "Human psychopharmacology of Ecstasy (MDMA): a review of 15 years of empirical research." Hum Psychopharmacol. Dec. 2001; 16(8): 557-577.
Peters. "Drug testing in blood: validated negative-ion chemical ionization gas chromatographic-mass spectrometric assay for enantioselective measurement of the designer drugs MDEA, MDMA, and MDA and its application to samples from a controlled study with MDMA", Clinical Chemistry (2005); 48(9); 1811-1822. doi: 10.1373/clinchem.2005.052746. Epub Aug. 11, 2005.
Peters, et al., Concentrations and ratios of amphetamine, methamphetamine, MDA, MDMA, and MDEA enantiomers determined in plasma samples from clinical toxicology and driving under the influence of drugs cases by GC-NICI-MS, Journal of Analytical Toxicology, Nov. 1, 2003, pp. 552-559.
Peters, et al., Drug testing in blood: validated negative-ion chemical ionization gas chromatographic-mass spectrometric assay for determination of amphetamine and methamphetamine enantiomers and its application to toxicology cases, Clinical Chemistry, Sep. 1, 2002, pp. 1472-1485.
Peters, et al., Negative-ion chemical ionization gas chromatography-mass spectrometry assay for enantioselective measurement of amphetamines in oral fluid: application to a controlled study with MDMA and driving under the influence cases, Clinical chemistry, Apr. 1, 2007 A, pp. 702-710.
Pitts et al., "3, 4-Methylenedioxymethamphetamine increases affiliative behaviors in squirrel monkeys in a serotonin 2A receptor-dependent manner", Neuropsychopharmacology (2017); 42(10): 1962-1971. doi: 10.1038/npp.2017.80. Epub Apr. 20, 2017.
Pitts. "(±)-MDMA and its enantiomers: potential therapeutic advantages of R(-)-MDMA", Psychopharmacology (2018); 235: 377-392. doi: 10.1007/s00213-017-4812-5. Epub Dec. 16, 2017.
Pizarro et al., "Synthesis and Capillary Electrophoretic Analysis of Enantiomerically Enriched Reference Standards of MDMA and its Main Metabolites," Bioorganic & Medicinal Chemistry (2002) 10: 1085-1092.
Pizarro. "Stereochemical analysis of 3, 4-methylenedioxymethamphetamine and its main metabolites in human samples including the catechol-type metabolite (3, 4-dihydroxymethamphetamine)", Drug Metabolism and Disposition (2004); 32(9): 1001-1007.
Pizzaro et al., "Determination of MDMA and its Metabolites in Blood and Urine by Gas Chromatography-Mass Spectrometry and Analysis of Enantiomers by Capillary Electrophoresis." J Anal Toxicol. Apr. 2002; 26(3): 157-65. doi: 10.1093/jat/26.3.157.
Pokorny et al., "Effect of Psilocybin on Empathy and Moral Decision-Making." International Journal of Neuropsychopharmacology (2017) 20(9): 747-757.
Pubchem 297429685 deposited on Jan. 27 (Jan. 27, 2016) p. 1-5. 2, structure.
Pubchem 459067002 deposited on Dec. 20, 2021 (Dec. 20, 2021) p. 1-5.
Pubchem SID 235735835, Feb. 13, 2015, 8 pages.
Pubchem SID 243280603, Mar. 16, 2015, 7 pages.
Pubchem, Substance Record for SID 104098418, Jan. 2011, 6 pages.
Pubcem, Substance Record for SID 117678335, Apr. 2011, 6 pages.
Pubchem, Substance Record for SID 38492237, Dec. 5, 2007, 5 pages.
Pubchem, Substance Record for SID 406789554, Jul. 18, 2020, 6 pages.
Pubchem, Substance Record for SID 439624087, Jan. 15, 2021, 6 pages.
Pubill, et al., Neuronal nicotinic receptors as new targets for amphetamine-induced oxidative damage and neurotoxicity, Pharmaceuticals, Jun. 15, 2011, pp. 822-847.
Rasmussen et al., "Chiral separation and quantification of R/S-amphetamine, R/S-methamphetamine, R/S-MDA, R/S-MDMA, and R/S-MDEA in whole blood by GC-EI-MS," Journal of Chromatography B, (2006) 842: 136-141.
Rickli et al., "Pharmacological profile of novel psychoactive benzofurans", British Journal of Pharmacology (2015); 172(13): 3412-3425. doi: 10.1111/bph.13128. Epub Apr. 24, 2015.
Rothman et al., "Amphetamine-type central nervous system stimulants release norepinephrine more potently than they release dopamine and serotonin", Synapse. Jan. 2001; 39(1): 32-41.
Rudnick, et al., The molecular mechanism of "ecstasy" [3, 4-methylenedioxy-methamphetamine (MDMA)]: serotonin transporters are targets for MDMA-induced serotonin release, Proceedings of the National Academy of Sciences, Mar. 1, 1992, pp. 1817-1821.
Saez-Briones and Hernandez, "MDMA (3,4-Methylenedioxymethamphetamine) Analogues as Tools to Characterize MDMA-Like Effects: An Approach to Understand Entactogen Pharmacology." Curr Neuropharmacol. Sep. 2013; 11(5): 521-34. doi: 10.2174/1570159X11311050007.
Sager et al., "In vitro to in vivo extrapolation of the complex drug-drug interaction of bupropion and its metabolites with CYP2D6; simultaneous reversible inhibition and CYP2D6 downregulation."

(56) References Cited

OTHER PUBLICATIONS

Biochem Pharmacol. Jan. 1, 2017: 123: 85-96. doi: 10.1016/j.bcp. 2016.11.007. Epub Nov. 9, 2016.

Sandtner et al., "Binding Mode Selection Determines the Action of Ecstasy Homologs at Monoamine Transporters." Mol Pharmacol. Jan. 2016; 89(1): 165-75. doi:10.1124/mol.115.101394. Epub Oct. 30, 2015.

Schenk and Bradbury, "Persistent sensitisation to the locomotor activating effects of MDMA following MDMA self-administration in rats." Pharmacol Biochem Behav. May 2015: 132: 103-107. doi: 10.1016/j.pbb.2015.03.001. Epub Mar. 8, 2015.

Schmid et al., "Acute subjective effects in LSD-and MDMA-assisted psychotherapy", Journal of Psychopharmacology (2021); 35(4): 362-374. doi: 10.1177/0269881120959604. Epub Oct. 8, 2020.

Schwaninger, et al., "Development and validation of LC-HRMS and GC-NICI-MS methods for stereoselective determination of MDMA and its phase I and II metabolites in human urine." Journal of Mass Spectrometry, Jul. 2011, pp. 603-614.

Schwaninger, et al., "Stereoselective urinary MDMA (ecstasy) and metabolites excretion kinetics following controlled MDMA administration to humans." Biochemical pharmacology, Jan. 1, 2012, pp. 131-138.

Segura, M., et al., "Contribution of cytochrome P450 2D6 to 3,4-methylenedioxymethamphetamine disposition in humans: use of paroxetine as a metabolic inhibitor probe." Clin Pharmacokinet. 2005; 44(6): 649-60. doi: 10.2165/00003088-200544060-00006.

Setola, et al., 3, 4-methylenedioxymethamphetamine (MDMA, "Ecstasy") induces fenfluramine-like proliferative actions on human cardiac valvular interstitial cells in vitro, Molecular Pharmacology, Jun. 1, 2003, pp. 1223-1229.

Simmler. "Pharmacological characterization of designer cathinones in vitro", British Journal of Pharmacology (2013) 168(2): 458-470. doi: 10.1111/j.1476-5381.2012.02145.x.

Spanos and Yamamoto, "Acute and subchronic effects of methylenedioxymethamphetamine [(+/−)MDMA] on locomotion and serotonin syndrome behavior in the rat." Pharmacol Biochem Behav. Apr. 1989; 32(4): 835-40. doi: 10.1016/0091-3057(89)90044-0.

Steele, et al., "Stereochemical effects of 3, 4-methylenedioxymethamphetamine (MDMA) and related amphetamine derivatives on inhibition of uptake of [3H] monoamines into synaptosomes from different regions of rat brain." Biochemical Pharmacology, Jul. 15, 1987, pp. 2297-2303.

Steuer et al., "Impact of cytochrome P450 2D6 function on the chiral blood plasma pharmacokinetics of 3, 4-methylenedioxymethamphetamine (MDMA) and its phase I and II metabolites in humans", PloS One (2016); 11(3): e0150955; 19 pages. doi: 10.1371/journal.pone.0150955.

Strajhar, et al., Effects of lisdexamfetamine on plasma steroid concentrations compared with d-amphetamine in healthy subjects: A randomized, double-blind, placebo-controlled study, The Journal of steroid biochemistry and molecular biology, Feb. 2019, pp. 212-225.

Straumann, I., et al., "Acute effects of R-MDMA, S-MDMA, and racemic MDMA in a randomized double-blind cross-over trial in healthy participants." Neuropsychopharmacology. Dec. 2024; 50(2): 362-371. doi: 10.1038/s41386-024-01972-6. Epub Aug. 23, 2024.

Sun, et al., Facile and universal immobilization of L-lysine inspired by mussels, J. Mater. Chem., 2012, Journal of Materials Chemistry, 2012, pp. 10035-41.

Thomas, et al., "Characterization of 3, 4-methylenedioxypyrovalerone discrimination in female Sprague-Dawley rats." Behavioural Pharmacology, Jul. 2021, pp. 524-532.

Thomas et al., "Psilocybin and Ketamine Acutely Promote Wakefulness, Suppress REM Sleep but Differentially Modulate High Frequency EEG Oscillatory Power in Wistar Kyoto Rats—a Preliminary Analysis." ACNP 59th Annual Meeting: Poster Session I, Neuropsychopharmacology. Dec. 2020;45(Suppl 1):68-169. M140, doi: 10.1038/s41386-020-00890-7, 1 page.

Thomsen, et al., "In Vitro Drug Metabolism by Human Carboxylesterase 1: Focus on Angiotensin-Converting Enzyme Inhibitors." Drug Metab Dispos. Jan. 2014; 42(1): 126-33. doi: 10.1124/dmd.113. 053512. Epub Oct. 18, 2013.

Torner, L., "Actions of Prolactin in the Brain: From Physiological Adaptations to Stress and Neurogenesis to Psychopathology." Front Endocrinol (Lausanne). Mar. 30, 2016: 7: 25. doi: 10.3389/fendo. 2016.00025. eCollection 2016. 6 pages.

Tournier, et al., Interaction of drugs of abuse and maintenance treatments with human P-glycoprotein (ABCB1) and breast cancer resistance protein (ABCG2), International Journal of Neuropsychopharmacology, Aug. 1, 2010, pp. 905-915.

Traynor, J.M., et al., "MDMA-Assisted Psychotherapy for BorderlinePersonality Disorder". Focus, 2022, 20(4):358-67, (focus.psychiatryonline.org).

U.S. Appl. No. 18/990,840, filed Dec. 20, 2024, by Rao et al.

Verrico. "MDMA (ecstasy) and human dopamine, norepinephrine, and serotonin transporters: implications for MDMA induced neurotoxicity and treatment", Psychopharmacology (2007); 189(4): 489-503. doi: 10.1007/s00213-005-0174-5. Epub Oct. 12, 2005.

Verweij , A., "Impurities in illicit drug preparations; 3,4-methylenedioxyamphetamine and 3-4-methylenedioxymethylamphetamine", Forensic. Sci. Rev., 1992, pp. 1-6.

Weinstock, et al., Synthesis and renal vasodilator activity of some dopamine agonist 1-aryl-2,3,4,5-tetrahydro-1H-3-benzazepine-7,8-diols: halogen and methyl analogs of fenoldopam, Journal of Medicinal Chemistry, 1986, pp. 2315-2325.

Willins and Meltzer, "Direct injection of 5-HT2A receptor agonists into the medial prefrontal cortex produces a head-twitch response in rats." J Pharmacol Exp Ther. Aug. 1997; 282(2): 699-706.

Winstock, et al., "Ecstasy pill testing: harm minimization gone too far?" Addiction, 2001, pp. 1139-1148.

Wu, et al., Estimation of tamoxifen metabolite concentrations in the blood of breast cancer patients through CYP2D6 genotype activity score, Breast Cancer Research and Treatment, 2012, pp. 677-683.

Young et al., "MDMA (N-methyl-3, 4-methylenedioxyamphetamine) and its stereoisomers: Similarities and differences in behavioral effects in an automated activity apparatus in mice", Pharmacology Biochemistry and Behavior (2008); 88(3): 318-331. doi: 10.1016/j.pbb.2007.09.002. Epub Sep. 14, 2007.

Young, M.B., et al., "3,4-Methylenedioxymethamphetamine facilitates fear extinction learning", Transl Psychiatry. Sep. 15, 2015; 5(9): e634. 8 pages.

Yubero-Lahoz et al., "Changes in CYP1A2 Activity in Humans after 3,4-Methylenedioxymethamphetamine (MDMA, Ecstasy) Administration Using Caffeine as a Probe Drug." Drug Metab. Pharmacokinet. 27 (6): 605-613 (2012).

Zapata-Torres et al., "Quantum-chemical, NMR and X-ray diffraction studies on (±)-1-[3, 4-(methylenedioxy) phenyl]-2-methylaminopropane", Journal of Molecular Graphics and Modelling (2008); 26(8): 1296-1305.

* cited by examiner

NITRIC OXIDE RELEASING PRODRUGS OF MDA AND MDMA

CROSS-REFERENCE TO RELATED APPLICATION

The present application is a continuation application of U.S. application Ser. No. 18/147,189 filed Dec. 28, 2022, now U.S. Pat. No. 11,912,680, which claims priority to U.S. Provisional Application No. 63/294,225, filed Dec. 28, 2021, the contents of which are hereby incorporated by reference in their entirety.

BRIEF SUMMARY OF THE INVENTION

The present disclosure provides MDA or MDMA derivatives that release nitric oxide in vivo.

The present disclosure provides prodrugs of MDMA, MDA, and derivatives thereof, as well as pharmaceutical compositions thereof.

In embodiments, the present disclosure provides a compound of Formula (I):

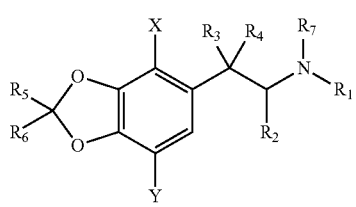

or a pharmaceutically acceptable salt thereof; wherein,
$R_1$ is $-(C=O)(CR_9R_9')_n-ONO_2$ or $-(C=O)(CR_9R_9')_m-CH(NH_2)CH_2ONO_2$;
$R_2$ is H, $C_1$-$C_4$ alkyl, or $CF_3$;
$R_3$ and $R_4$ are independently H or F;
$R_5$ and $R_6$ are independently H, $C_1$-$C_6$ alkyl, or $CF_3$;
$R_7$ is H or $CH_3$;
$R_8$ is H, $C_1$-$C_6$ alkyl, or $CF_3$;
$R_9$ and $R_9'$ are independently H, halogen, or $C_1$-$C_6$ alkyl;
X and Y are independently H, F, Cl, Br, or $OR^8$;
n is an integer from 1 to 9; and
m is an integer from 1 to 9.

In embodiments, the present disclosure provides a compound selected from Table 1 or a pharmaceutically acceptable salt thereof.

TABLE 1

| No. | Compounds Structure |
|---|---|
| 1-1 | |
| 1-2 | |
| 1-3 | |
| 1-5 | |
| 1-6 | |
| 1-7 | |

In embodiments, the present disclosure provides a compound of Formula (II):

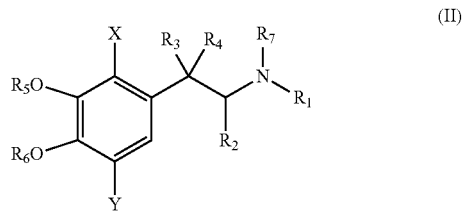

or a pharmaceutically acceptable salt thereof; wherein,
$R_1$ is $-(C=O)(CR_9R_9')_m-ONO_2$ or $-(C=O)(CR_9R_9')_m-CH(NH_2)CH_2ONO_2$;
$R_2$ is H, $C_1$-$C_4$ alkyl or $CF_3$;
$R_3$ and $R_4$ are independently H or F;
$R_5$ and $R_6$ are independently H, $C_1$-$C_6$ alkyl, or $CF_3$;
$R_7$ is H or $CH_3$;
$R_8$ is H, $C_1$-$C_6$ alkyl, or CF;
$R_9$ and $R_9'$ are independently H, halogen, or $C_1$-$C_6$ alkyl;
X and Y are independently H, F, Cl, Br, or $OR^8$,
n is an integer from 1 to 9; and
m is an integer from 1 to 9.

In embodiments, the present disclosure provides a compound of Formula (III):

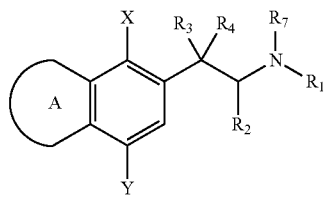

or a pharmaceutically acceptable salt thereof; wherein,
A is

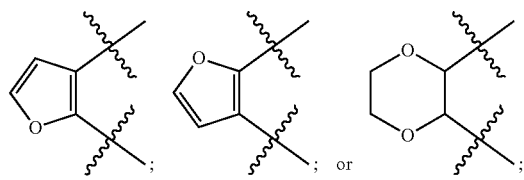 [SMILES: *c1ccoc1* ; *c1ccoc1* ; *C1OCCOC1*]

R$_1$ is —(C=O)(CR$_9$R$_9$')$_n$—ONO$_2$ or —(C=O)(CR$_9$R$_9$')$_m$—CH(NH$_2$)CH$_2$ONO$_2$,
R$_2$ is H, C$_1$-C$_4$ alkyl or CF$_3$;
R$_3$ and R$_4$ are independently H or F;
R$_7$ is H or CH$_3$;
R$_8$ is H, C$_1$-C$_6$ alkyl, or CF$_3$;
X and Y are independently H, F, Cl, Br, or OR$^8$;
n is an integer from 1 to 9; and
m is an integer from 1 to 9.

In embodiments, the present disclosure provides a compound selected from Table 2 or a pharmaceutically acceptable salt thereof.

TABLE 2

| No. | Structure |
|---|---|
| 2-1 | (structure) |
| 2-2 | (structure) |
| 2-3 | (structure) |
| 2-4 | (structure) |
| 2-5 | (structure) |
| 2-6 | (structure) |
| 2-7 | (structure) |
| 2-8 | (structure) |
| 2-9 | (structure) |
| 2-10 | (structure) |

In some embodiments, present disclosure provides a pharmaceutical composition comprising a therapeutically effective amount of one or more compounds of the present disclosure (e.g., a compound of Formula (I), (II), (III), Table 1 or Table 2) or a pharmaceutically acceptable salt thereof and a pharmaceutically acceptable excipient.

DETAILED DESCRIPTION OF THE INVENTION

Throughout this disclosure, various patents, patent applications and publications are referenced. The disclosures of these patents, patent applications and publications in their entireties are incorporated into this disclosure by reference for all purposes in order to more fully describe the state of the art as known to those skilled therein as of the date of this disclosure. This disclosure will govern in the instance that there is any inconsistency between the patents, patent applications and publications cited and this disclosure.

Definitions

For convenience, certain terms employed in the specification, examples and claims are collected here. Unless defined otherwise, all technical and scientific terms used in this disclosure have the same meanings as commonly understood by one of ordinary skill in the art to which this disclosure belongs.

The terms "administer," "administering" or "administration" as used herein refer to administering a compound or pharmaceutically acceptable salt of the compound or a composition or formulation comprising the compound or pharmaceutically acceptable salt of the compound to a patient.

The term "treating" as used herein with regard to a patient or subject, refers to improving at least one symptom of the patient's or subject's disorder. In some embodiments, treating can be improving, or at least partially ameliorating a disorder or one or more symptoms of a disorder.

The term "therapeutically effective" applied to dose or amount refers to that quantity of a compound or pharmaceutical formulation that is sufficient to result in a desired clinical benefit after administration to a patient or subject in need thereof.

The term "pharmaceutically acceptable salts" includes both acid and base addition salts. Pharmaceutically acceptable salts include those obtained by reacting the active compound functioning as a base, with an inorganic or organic acid to form a salt, for example, salts of hydrochloric acid, sulfuric acid, phosphoric acid, methanesulfonic acid, camphorsulfonic acid, oxalic acid, maleic acid, succinic acid, citric acid, formic acid, hydrobromic acid, benzoic acid, tartaric acid, fumaric acid, salicylic acid, mandelic acid, carbonic acid, etc. The acids that may be used to prepare pharmaceutically acceptable acid addition salts of such basic compounds are those that form non-toxic acid addition salts, i.e., salts containing pharmaceutically acceptable anions, including but not limited to: malate, oxalate, chloride, bromide, iodide, nitrate, acetate, tartrate, oleate, fumarate, formate, benzoate, glutamate, methanesulfonate, benzenesulfonate, and p-toluenesulfonate salts. Base addition salts include but are not limited to, ethylenediamine, N-methyl-glucamine, lysine, arginine, ornithine, choline, N,N'-dibenzylethylenediamine, chloroprocaine, diethanolamine, procaine, N-benzylphenethylamine, diethylamine, piperazine, tris-(hydroxymethyl)-aminomethane, tetramethylammonium hydroxide, triethylamine, dibenzylamine, ephenamine, dehydroabietylamine, N-ethylpiperidine, benzylamine, tetramethylammonium, tetraethylammonium, methylamine, dimethylamine, trimethylamine, ethylamine, basic amino acids, e.g., lysine and arginine dicyclohexylamine and the like. Examples of metal salts include lithium, sodium, potassium, magnesium, calcium salts and the like. Examples of ammonium and alkylated ammonium salts include ammonium, methylammonium, dimethylammonium, trimethylammonium, ethylammonium, hydroxyethylammonium, diethylammonium, butylammonium, tetramethylammonium salts and the like. Examples of organic bases include lysine, arginine, guanidine, diethanolamine, choline and the like. Those skilled in the art will further recognize that acid addition salts may be prepared by reaction of the compounds with the appropriate inorganic or organic acid via any of a number of known methods.

When a range of values is listed, it is intended to encompass each value and sub-range within the range. For example, "$C_1$-$C_6$ alkyl" is intended to encompass $C_1$, $C_2$, $C_3$, $C_4$, $C_5$, $C_6$, $C_{1-6}$, $C_{1-5}$, $C_{1-4}$, $C_{1-3}$, $C_{1-2}$, $C_{2-6}$, $C_{2-5}$, $C_{2-4}$, $C_{2-3}$, $C_{3-6}$, $C_{3-5}$, $C_{3-4}$, $C_{4-6}$, $C_{4-5}$, and $C_{5-6}$ alkyl.

"Alkyl" or "alkyl group" refers to a fully saturated, straight or branched hydrocarbon chain having from one to twelve carbon atoms, and which is attached to the rest of the molecule by a single bond. Alkyls comprising any number of carbon atoms from 1 to 12 are included. An alkyl comprising up to 12 carbon atoms is a $C_1$-$C_{12}$ alkyl, an alkyl comprising up to 10 carbon atoms is a $C_1$-$C_{10}$ alkyl, an alkyl comprising up to 6 carbon atoms is a $C_1$-$C_6$ alkyl and an alkyl comprising up to 5 carbon atoms is a $C_1$-$C_5$ alkyl. A $C_1$-$C_5$ alkyl includes $C_5$ alkyls, $C_4$ alkyls, $C_3$ alkyls, $C_2$ alkyls and $C_1$ alkyl (i.e., methyl). A $C_1$-$C_6$ alkyl includes all moieties described above for $C_1$-$C_5$ alkyls but also includes $C_6$ alkyls. A $C_1$-$C_{10}$ alkyl includes all moieties described above for $C_1$-$C_5$ alkyls and $C_1$-$C_6$ alkyls, but also includes $C_7$, $C_8$, $C_9$ and $C_{10}$ alkyls. Similarly, a $C_1$-$C_{12}$ alkyl includes all the foregoing moieties, but also includes $C_{11}$ and $C_{12}$ alkyls. Non-limiting examples of $C_1$-$C_{12}$ alkyl include methyl, ethyl, n-propyl, i-propyl, sec-propyl, n-butyl, i-butyl, sec-butyl, t-butyl, n-pentyl, t-amyl, n-hexyl, n-heptyl, n-octyl, n-nonyl, n-decyl, n-undecyl, and n-dodecyl. Unless stated otherwise specifically in the specification, an alkyl group can be optionally substituted.

"Alkoxy" refers to a group of the formula —$OR_a$ where $R_a$ is an alkyl, alkenyl or alknyl as defined above containing one to twelve carbon atoms. Unless stated otherwise specifically in the specification, an alkoxy group can be optionally substituted.

"Haloalkyl" refers to an alkyl, as defined above, that is substituted by one or more halo radicals, e.g., trifluoromethyl, difluoromethyl, trichloromethyl, 2,2,2-trifluoroethyl, 1,2-difluoroethyl, 3-bromo-2-fluoropropyl, 1,2-dibromoethyl, and the like. Unless stated otherwise specifically in the specification, a haloalkyl group can be optionally substituted.

The term "substituted" used herein means any of the groups described herein (e.g., alkyl, alkenyl, alkynyl, alkoxy, aryl, cycloalkyl, cycloalkenyl, cycloalkynyl, haloalkyl, heterocyclyl, and/or heteroaryl) wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with —$NR_gR_h$, —$NR_gC(=O)$ $R_h$, —$NR_gC(=O)$ $NR_gR_h$, —$NR_gC(=O)$ $OR_h$, —$NR_gSO_2R_h$, —$OC(=O)$ $NR_gR_h$, —$OR_g$, —$SR_g$, —$SOR_g$, —$SO_2R_g$, —$OSO_2R_g$, —$SO_2OR_g$, =$NSO_2R_g$, and —$SO_2NR_gR_h$. "Substituted" also means any of the above groups in which one or more hydrogen atoms are replaced with —C(=O)R$_g$, —C(=O)OR$_g$, —C(=O)NR$_g$R$_h$, —CH$_2$SO$_2$R$_g$, —CH$_2$SO$_2$NR$_g$R$_h$. In the foregoing, R$_g$ and R$_h$ are the same or different and independently hydrogen, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, cyano, hydroxyl, imino, nitro, oxo, thioxo, halo, alkyl, alkenyl, alkynyl, alkoxy, alkylamino, thioalkyl, aryl, aralkyl, cycloalkyl, cycloalkenyl, cycloalkynyl, cycloalkylalkyl, haloalkyl, haloalkenyl, haloalkynyl, heterocyclyl, N-heterocyclyl, heterocyclylalkyl, heteroaryl, N-heteroaryl and/or heteroarylalkyl group. In addition, each of the foregoing substituents can also be optionally substituted with one or more of the above substituents.

As used herein, the symbol (hereinafter can be referred to as "a point of attachment bond") denotes a bond that is a point of attachment between two chemical entities, one of which is depicted as being attached to the point of attachment bond and the other of which is not depicted as being attached to the point of attachment bond. For example, indicates that the chemical entity "XY" is bonded to another chemical entity via the point of attachment bond. Furthermore, the specific point of attachment to the non-depicted chemical entity can be specified by inference. For example, the compound CH$_3$—R$^{3X}$, wherein R$^{3X}$ is H or infers that when R$^{3X}$ is "XY", the point of attachment bond is the same bond as the bond by which R$^{3X}$ is depicted as being bonded to CH$_3$.

Compounds

In one aspect, the present disclosure provides prodrugs of MDMA, MDA, and derivatives thereof, that release nitric oxide in vivo.

In embodiments, the present disclosure provides a compound of Formula (I):

(I)

or a pharmaceutically acceptable salt thereof; wherein,
R$_1$ is —(C=O)(CR$_9$R$_9$')$_n$—ONO$_2$ or —(C=O)(CR$_9$R$_9$')$_m$—CH(NH$_2$)CH$_2$ONO$_2$;
R$_2$ is H, C$_1$-C$_4$ alkyl, or CF$_3$;
R$_3$ and R$_4$ are independently H or F;
R$_5$ and R$_6$ are independently H, C$_1$-C$_6$ alkyl, or CF$_3$;
R$_7$ is H or CH$_3$; and
R$_8$ is H, C$_1$-C$_6$ alkyl, or CF$_3$;
R$_9$ and R$_9$' are independently H, halogen, or C$_1$-C$_6$ alkyl;
X and Y are independently H, F, Cl, Br, or OR$^8$;
n is an integer from 1 to 9; and
m is an integer from 1 to 9.

In embodiments of the compounds of Formula (I), R$_1$ is —(C=O)(CH$_2$)$_n$—ONO$_2$.

In embodiments of the compounds of Formula (I), R$_1$ is —(C=O)(CH$_2$)$_m$—CH(NH$_2$)CH$_2$ONO$_2$.

In embodiments of the compounds of Formula (I), R$_2$ is C$_1$-C$_4$ alkyl.

In embodiments of the compounds of Formula (I), R$_2$ is methyl.

In embodiments of the compounds of Formula (I), R$_2$ is CF$_3$.

In embodiments of the compounds of Formula (I), R$_3$ and R$_4$ are H.

In embodiments of the compounds of Formula (I), R$_3$ and R$_4$ are F.

In embodiments of the compounds of Formula (I), R$_5$ and R$_6$ are H.

In embodiments of the compounds of Formula (I), R$_5$ and R$_6$ are C$_1$-C$_6$ alkyl.

In embodiments of the compounds of Formula (I), R$_5$ and R$_6$ are CF$_3$.

In embodiments of the compounds of Formula (I), R$_7$ is H.

In embodiments of the compounds of Formula (I), R$_7$ is CH$_3$.

In embodiments of the compounds of Formula (I), X and Y are H.

In embodiments of the compounds of Formula (I), X and Y are F.

In embodiments of the compounds of Formula (I), m is 2.
In embodiments of the compounds of Formula (I), n is 3.
In embodiments of the compounds of Formula (I), n is 4.

In embodiments, the present disclosure provides a compound selected from Table 1 or a pharmaceutically acceptable salt thereof.

TABLE 1

Compounds

| No. | Structure |
|---|---|
| 1-1 | |

TABLE 1-continued

Compounds

| No. | Structure |
|---|---|
| 1-2 | 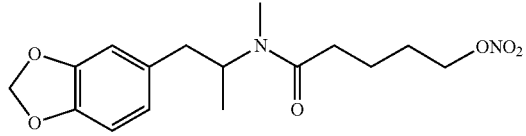 |
| 1-3 | 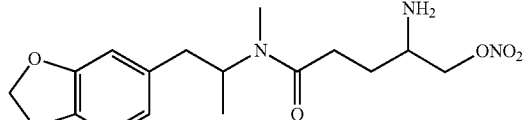 |
| 1-5 | 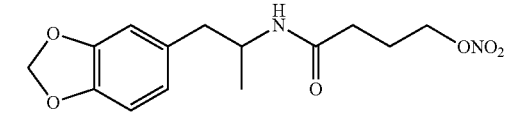 |
| 1-6 | 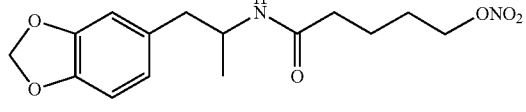 |
| 1-7 | 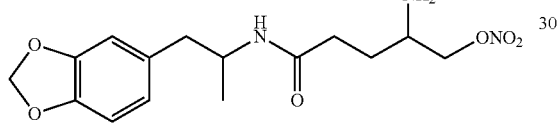 |

In embodiments, the present disclosure provides a compound of Formula (II):

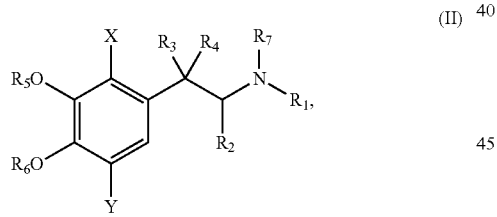

(II)

or a pharmaceutically acceptable salt thereof; wherein, $R_1$ is —(C=O)(CR$_9$R$_9$')$_n$—ONO$_2$ or —(C=O)(CR$_9$R$_9$')$_m$—CH(NH$_2$)CH$_2$ONO$_2$;
$R_2$ is H, $C_1$-$C_4$ alkyl, or CF$_3$;
$R_3$ and $R_4$ are independently H or F;
$R_5$ and $R_6$ are independently H, $C_1$-$C_6$ alkyl, or CF$_3$;
$R_7$ is H or CH$_3$;
$R_8$ is H, $C_1$-$C_6$ alkyl, or CF$_3$;
$R_9$ and $R_9$' are independently H, halogen, or $C_1$-$C_6$ alkyl;
X and Y are independently H, F, Cl, Br, or OR$^8$;
n is an integer from 1 to 9; and
m is an integer from 1 to 9.

In embodiments, the present disclosure provides a compound of Formula (III):

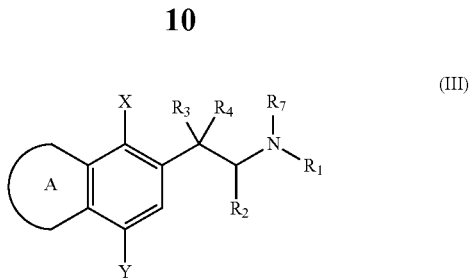

(III)

or a pharmaceutically acceptable salt thereof; wherein,
A is

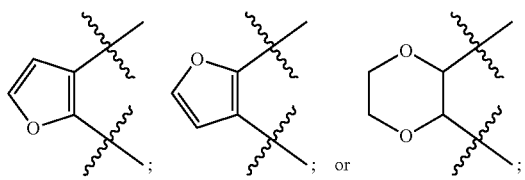 [SMILES: *c1ccoc1* ; *c1ccoc1* ; *C1OCCOC1*]

$R_1$ is —(C=O)(CR$_9$R$_9$')$_n$—ONO$_2$ or —(C=O)(CR$_9$R$_9$')$_m$—CH(NH$_2$)CH$_2$ONO$_2$;
$R_2$ is H, $C_1$-$C_4$ alkyl or CF$_3$;
$R_3$ and $R_4$ are independently H or F;
$R_5$ and $R_6$ are independently H, $C_1$-$C_6$ alkyl, or CF$_3$;
$R_7$ is H or CH$_3$;
$R_8$ is H, $C_1$-$C_6$ alkyl, or CF$_3$;
$R_9$ and $R_9$' are independently H, halogen, or $C_1$-$C_6$ alkyl;
X and Y are independently H, F, Cl, Br, or OR$^8$;
n is an integer from 1 to 9; and
m is an integer from 1 to 9.

In embodiments of the compounds of Formula (III), A is

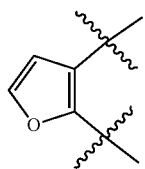

In embodiments of the compounds of Formula (III), A is

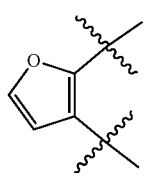

In embodiments of the compounds of Formula (III), A is

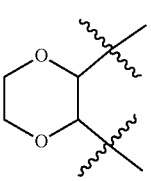

In embodiments of the compounds of Formula (II) or Formula (III), $R_1$ is —(C=O)(CR$_9$R$_9$')$_n$—ONO$_2$.

In embodiments of the compounds of Formula (II) or Formula (III), $R_1$ is —(C=O)(CR$_9$R$_9$')$_m$—CH(NH$_2$)CH$_2$ONO$_2$.

In embodiments of the compounds of Formula (II) or Formula (III), $R_9$ and $R_9$' are independently halogen or $C_1$-$C_6$ alkyl.

In embodiments of the compounds of Formula (II) or Formula (III), $R_1$ is —(C=O)(CH$_2$)$_n$—ONO$_2$.

In embodiments of the compounds of Formula (II) or Formula (III), $R_1$ is —(C=O)(CH$_2$)$_m$—CH(NH$_2$)CH$_2$ONO$_2$.

In embodiments of the compounds of Formula (II) or Formula (III), $R_2$ is $C_1$-$C_4$ alkyl.

In embodiments of the compounds of Formula (II) or Formula (III), $R_2$ is methyl.

In embodiments of the compounds of Formula (II) or Formula (III), $R_2$ is $CF_3$.

In embodiments of the compounds of Formula (II) or Formula (III), $R_3$ and $R_4$ are H.

In embodiments of the compounds of Formula (II) or Formula (III), $R_3$ and $R_4$ are F.

In embodiments of the compounds of Formula (II), $R_5$ and $R_6$ are H.

In embodiments of the compounds of Formula (II), $R_5$ and $R_6$ are $C_1$-$C_6$ alkyl.

In embodiments of the compounds of Formula (II), $R_5$ and $R_6$ are $CF_3$.

In embodiments of the compounds of Formula (II) or Formula (III), $R_7$ is H.

In embodiments of the compounds of Formula (II) or Formula (III), $R_7$ is $CH_3$.

In embodiments of the compounds of Formula (II) or Formula (III), X and Y are H.

In embodiments of the compounds of Formula (II) or Formula (III), X and Y are F.

In embodiments of the compounds of Formula (II) or Formula (III), m is 2.

In embodiments of the compounds of Formula (II) or Formula (III), n is 3.

In embodiments of the compounds of Formula (II) or Formula (III), n is 4.

In embodiments, the present disclosure provides a compound selected from Table 2 or a pharmaceutically acceptable salt thereof.

TABLE 2

| No. | Structure | Name |
| --- | --- | --- |
| 2-1 | | (R)-4-((1-(benzo[d][1,3]dioxol-5-yl)propan-2-yl)amino)-4-oxobutyl nitrate |
| 2-2 | | (R)-4-((1-(benzofuran-5-yl)propan-2-yl)amino)-4-oxobutyl nitrate |
| 2-3 | | (R)-4-((1-(benzofuran-6-yl)propan-2-yl)amino)-4-oxobutyl nitrate |
| 2-4 | | (R)-4-((1-(2,3-dihydrobenzo[b][1,4]dioxin-6-yl)propan-2-yl)amino)-4-oxobutyl nitrate |
| 2-5 | | 4-((1-(benzo[d][1,3]dioxol-5-yl)propan-2-yl)amino)-4-oxobutyl nitrate |
| 2-6 | | (S)-4-((1-(benzo[d][1,3]dioxol-5-yl)propan-2-yl)amino)-4-oxobutyl nitrate |

TABLE 2-continued

Compounds

| No. | Structure | Name |
|---|---|---|
| 2-7 | | 3-amino-4-(((S)-1-(benzo[d][1,3]dioxol-5-yl)propan-2-yl)amino)-4-oxobutyl nitrate |
| 2-8 | | 3-amino-4-(((R)-1-(benzo[d][1,3]dioxol-5-yl)propan-2-yl)amino)-4-oxobutyl nitrate |
| 2-9 | | (R)-5-((1-(benzo[d][1,3]dioxol-5-yl)propan-2-yl)amino)-5-oxopentyl nitrate |
| 2-10 | | 2-amino-5-(((R)-1-(benzo[d][1,3]dioxol-5-yl)propan-2-yl)amino)-5-oxopentyl nitrate |

Compositions

In one aspect, the present disclosure provides a pharmaceutical composition comprising a therapeutically effective amount of one or more compounds of the present disclosure (e.g., a compound of Formula (I), (II), (III), Table 1 or Table 2) or a pharmaceutically acceptable salt thereof and a pharmaceutically acceptable excipient.

The pharmaceutically acceptable excipients and adjuvants are added to the composition or formulation for a variety of purposes. In some embodiments, a pharmaceutical composition comprising one or more compounds disclosed herein, or a pharmaceutically acceptable salt thereof, further comprise a pharmaceutically acceptable carrier. In some embodiments, a pharmaceutically acceptable carrier includes a pharmaceutically acceptable excipient, binder, and/or diluent. In some embodiments, suitable pharmaceutically acceptable carriers include, but are not limited to, inert solid fillers or diluents and sterile aqueous or organic solutions. In some embodiments, suitable pharmaceutically acceptable excipients include, but are not limited to, water, salt solutions, alcohol, polyethylene glycols, gelatin, lactose, amylase, magnesium stearate, talc, silicic acid, viscous paraffin, and the like.

For the purposes of this disclosure, the compounds of the present disclosure can be formulated for administration by a variety of means including orally, parenterally, by inhalation spray, topically, or rectally in formulations containing pharmaceutically acceptable carriers, adjuvants and vehicles. The term parenteral as used here includes subcutaneous, intravenous, intramuscular, and intraarterial injections with a variety of infusion techniques. Intraarterial and intravenous injection as used herein includes administration through catheters.

Methods of Treatment

In embodiments, the present disclosure provides a method of treating or preventing neurological disorders in a subject in need thereof, the method comprising administering to the subject a therapeutically effective amount of a compound disclosed herein, e.g., Formula (I), (II), (III), Table 1 or Table 2, or a pharmaceutically acceptable salt thereof.

In embodiments, the neurological disorder is a mood disorder. In embodiments, the mood disorder is clinical depression, postnatal depression or postpartum depression, perinatal depression, atypical depression, melancholic depression, psychotic major depression, cationic depression, seasonal affective disorder, dysthymia, double depression, depressive personality disorder, recurrent brief depression, major depressive disorder, minor depressive disorder, bipolar disorder or manic depressive disorder, depression caused by chronic medical conditions, treatment-resistant depression, refractory depression, suicidality, suicidal ideation, or suicidal behavior. In embodiments, the method described herein provides therapeutic effect to a subject suffering from depression (e.g., moderate or severe depression). In some embodiments, the mood disorder is associated with neuroendocrine diseases and disorders, neurodegenerative diseases and disorders (e.g., epilepsy), movement disorders, tremor (e.g., Parkinson's Disease), or women's health disorders or conditions. In embodiments the mood disorder is depression. In embodiments, the mood disorder is treatment-resistant depression or major depressive disorder. In some embodiments, the mood disorder is major depressive disorder. In embodiments, the mood disorder is treatment-resistant depression.

In some embodiments, the present disclosure provides a method of treating or preventing PTSD, mood disorders, general anxiety disorder, addictive disorders, and/or drug dependence in a subject in need thereof, the method comprising administering to the subject a therapeutically effective amount of a compound disclosed herein, e.g., a compound of Formula (I), (II), (III), Table 1, or Table 2, a pharmaceutically acceptable salt thereof, or a pharmaceutical composition thereof.

In embodiments, the compounds of the present disclosure are used to treat PTSD. In embodiments, the compounds of the present disclosure are used for induction and maintenance therapy to treat PTSD. In embodiments, the compounds of the present disclosure are used to treat PTSD with an improved safety profile when compared to treatment with the entactogenic, oneirophrenic or psychedelic compound (e.g. MDMA or related compound, psilocybin or dimethyltryptamine) alone. In embodiments, the compounds of the present disclosure are used for induction and maintenance therapy to treat PTSD with an improved safety profile when compared to treatment with the entactogenic, oneirophrenic or psychedelic compound (e.g. MDMA or related compound, psilocybin or dimethyltryptamine) alone.

In embodiments, the compounds of the present disclosure are used to treat behavioral or mood disorders. Examples of behavioral or mood disorders include anxiety, such as social anxiety in autistic subjects (e.g. autistic adults) and anxiety related to life-threatening illnesses, stress (where moderation thereof is measured, for example, by effects on amygdala responses). In some embodiments, the anxiety disorder is panic disorder, obsessive-compulsive disorder, or general anxiety disorder. Other examples include lack of motivation, attention, accuracy, speed of response, perseveration, and/or cognitive engagement. Further examples include depression (e.g., MDD or TRD), attention disorders, disorders of executive function and/or cognitive engagement, obsessive compulsive disorder, bipolar disorder, panic disorder, phobia, schizophrenia, psychopathy, antisocial personality disorder and/or neurocognitive disorders.

In embodiments, the compounds the present disclosure are used to treat an addictive disorder. In embodiments, the addictive disorder is alcohol abuse, substance abuse, smoking, or obesity. In embodiments, the disorder is an eating disorder (anorexia nervosa, bulimia, nervosa, binge eating disorder, etc.) or an auditory disorder.

In embodiments, the disorder is an impulsive disorder. In embodiments, the impulsive disorder is attention deficit hyperactivity disorder (ADHD), attention deficit disorder (ADD), Tourette's syndrome or autism.

In embodiments, the disorder is a compulsive disorder. In embodiments, the compulsive disorder is obsessive compulsive disorder (OCD), gambling, or aberrant sexual behavior.

In embodiments, the disorder is a personality disorder. In embodiments, the personality disorder is conduct disorder, antisocial personality, or aggressive behavior.

NUMBERED EMBODIMENTS

In addition to the disclosure above, the Examples below, and the appended claims, the disclosure sets for the following numbered embodiments.

1. A of Formula (I):

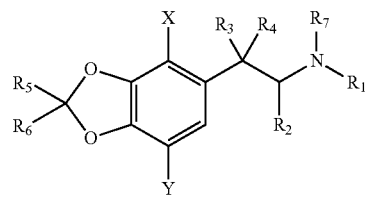

or a pharmaceutically acceptable salt thereof; wherein,
$R_1$ is —(C=O)(CR$_9$R$_9$')$_n$—ONO$_2$ or —(C=O)(CR$_9$R$_9$')$_m$—CH(NH$_2$)CH$_2$ONO$_2$;
$R_2$ is H, $C_1$-$C_4$ alkyl, or CF$_3$;
$R_3$ and $R_4$ are independently H or F;
$R_5$ and $R_6$ are independently H, $C_1$-$C_6$ alkyl, or CF$_3$;
$R_7$ is H or CH$_3$;
$R_8$ is H, $C_1$-$C_6$ alkyl, or CF$_3$;
$R_9$ and $R_9$' are independently H, halogen, or $C_1$-$C_6$ alkyl;
X and Y are independently H, F, Cl, Br, or OR$^8$,
n is an integer from 1 to 9; and
m is an integer from 1 to 9.

2. The compound of embodiment 1, wherein $R_1$ is —(C=O)(CR$_9$R$_9$')$_n$—ONO$_2$.

3. The compound of embodiment 1, wherein $R_1$ is —(C=O)(CR$_9$R$_9$')$_m$—CH(NH$_2$)CH$_2$ONO$_2$.

3a. The compound of embodiment 1, wherein $R_1$ is —(C=O)(CH$_2$)$_n$—ONO$_2$.

4. The compound of embodiment 1, wherein $R_1$ is —(C=O)(CH$_2$)$_m$—CH(NH$_2$)CH$_2$ONO$_2$.

5. The compound of any one of embodiments 1-4, wherein $R_2$ is $C_1$-$C_4$ alkyl.

6. The compound of any one of embodiments 1-4, wherein $R_2$ is methyl.

7. The compound of any one of embodiments 1-4, wherein $R_2$ is CF$_3$.

8. The compound of any one of embodiments 1-7, wherein $R_3$ and $R_4$ are H.

9. The compound of any one of embodiments 1-7, wherein $R_3$ and $R_4$ are F.

10. The compound of any one of embodiments 1-9, wherein $R_5$ and $R_6$ are H.

11. The compound of any one of embodiments 1-9, wherein $R_5$ and $R_6$ are $C_1$-$C_6$ alkyl.

12. The compound of any one of embodiments 1-9, wherein $R_5$ and $R_6$ are CF$_3$.

13. The compound of any one of embodiments 1-12, wherein $R_7$ is H.

14. The compound of any one of embodiments 1-12, wherein $R_7$ is CH$_3$.

15. The compound of any one of embodiments 1-14, wherein X and Y are H.

16. The compound of any one of embodiments 1-14, wherein X and Y are F.

17. The compound of any one of embodiments 1-16, wherein m is 2.

18. The compound of any one of embodiments 1-17, wherein n is 3.

19. The compound of any one of embodiments 1-17, wherein n is 4.

20. The compound of embodiment 1, having the formula:

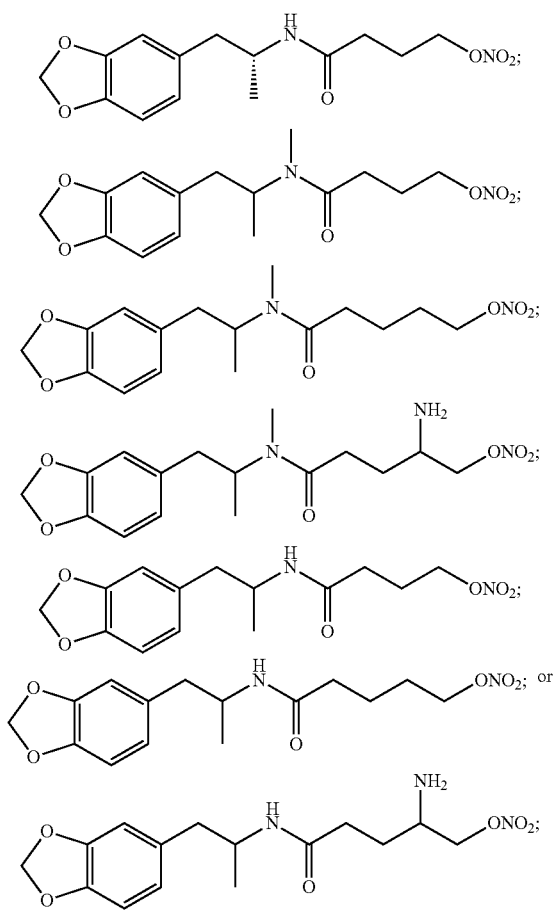

or a pharmaceutically acceptable salt thereof.

21. A compound of Formula (II):

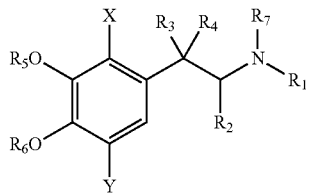

or a pharmaceutically acceptable salt thereof; wherein,
$R_1$ is —(C=O)(CR$_9$R$_9$')$_n$—ONO$_2$ or —(C=O)(CR$_9$R$_9$')$_m$—CH(NH$_2$)CH$_2$ONO$_2$;
$R_2$ is H, $C_1$-$C_4$ alkyl or CF$_3$;
$R_3$ and $R_4$ are independently H or F;
$R_5$ and $R_6$ are independently H, $C_1$-$C_6$ alkyl, or CF$_3$;
$R_7$ is H or CH$_3$;
$R_8$ is H, $C_1$-$C_6$ alkyl, or CF;
$R_9$ and $R_9$' are independently H, halogen, or $C_1$-$C_6$ alkyl;
X and Y are independently H, F, Cl, Br, or OR$^8$;
n is an integer from 1 to 9; and
m is an integer from 1 to 9.

22. The compound of embodiment 21, wherein $R_1$ is —(C=O)(CR$_9$R$_9$')$_n$—ONO$_2$.

23. The compound of embodiment 21, wherein $R_1$ is —(C=O)(CR$_9$R$_9$')$_m$—CH(NH$_2$)CH$_2$ONO$_2$.

24. The compound of embodiment 21, wherein $R_1$ is —(C=O)(CH$_2$)$_n$—ONO$_2$.

25. The compound of embodiment 21, wherein $R_1$ is —(C=O)(CH$_2$)$_m$—CH(NH$_2$)CH$_2$ONO$_2$.

26. The compound of any one of embodiments 21-25, wherein $R_2$ is $C_1$-$C_4$ alkyl.

27. The compound of any one of embodiments 21-26, wherein $R_2$ is methyl.

28. The compound of any one of embodiments 21-25, wherein $R_2$ is CF$_3$.

29. The compound of any one of embodiments 21-28, wherein $R_3$ and $R_4$ are H.

30. The compound of any one of embodiments 21-28, wherein $R_3$ and $R_4$ are F.

31. The compound of any one of embodiments 21-30, wherein $R_5$ and $R_6$ are H.

32. The compound of any one of embodiments 21-30, wherein $R_5$ and $R_6$ are $C_1$-$C_6$ alkyl.

33. The compound of any one of embodiments 21-30, wherein $R_5$ and $R_6$ are CF$_3$.

34. The compound of any one of embodiments 21-33, wherein $R_7$ is H.

35. The compound of any one of embodiments 21-33, wherein $R_7$ is CH$_3$.

36. The compound of any one of embodiments 21-35, wherein X and Y are H.

37. The compound of any one of embodiments 21-35, wherein X and Y are F.

38. The compound of any one of embodiments 21-37, wherein m is 2.

39. The compound of any one of embodiments 21-38, wherein n is 3.

40. The compound of any one of embodiments 21-38, wherein n is 4.

41. A compound of Formula (III):

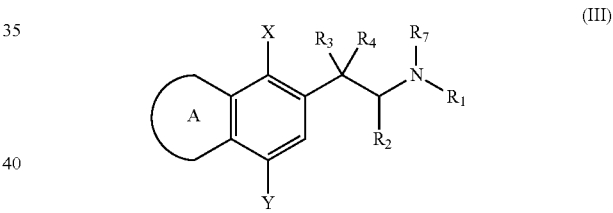

or a pharmaceutically acceptable salt thereof; wherein,
A is

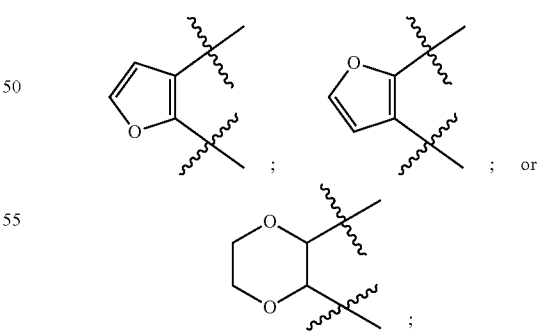

$R_1$ is —(C=O)(CR$_9$R$_9$')$_n$—ONO$_2$ or —(C=O)(CR$_9$R$_9$')$_m$—CH(NH$_2$)CH$_2$ONO$_2$;
$R_2$ is H, $C_1$-$C_4$ alkyl or CF$_3$;
$R_3$ and $R_4$ are independently H or F;
$R_5$ and $R_6$ are independently H, $C_1$-$C_6$ alkyl, or CF$_3$;
$R_7$ is H or CH$_3$;
$R_8$ is H, $C_1$-$C_6$ alkyl, or CF$_3$;

X and Y are independently H, F, Cl, Br, or OR[8],
n is an integer from 1 to 9; and
m is an integer from 1 to 9.

42. The compound of embodiment 41, wherein $R_1$ is —(C=O)(CR$_9$R$_9$')$_n$—ONO$_2$.
43. The compound of embodiment 41, wherein $R_1$ is —(C=O)(CR$_9$R$_9$')$_m$—CH(NH$_2$)CH$_2$ONO$_2$.
44. The compound of embodiment 41, wherein $R_1$ is —(C=O)(CH$_2$)$_n$—ONO$_2$.
45. The compound of embodiment 41, wherein $R_1$ is —(C=O)(CH$_2$)$_m$—CH(NH$_2$)CH$_2$ONO$_2$.
46. The compound of any one of embodiments 41-45, wherein $R_2$ is $C_1$-$C_4$ alkyl.
47. The compound of any one of embodiments 41-46, wherein $R_2$ is methyl.
48. The compound of any one of embodiments 41-45, wherein $R_2$ is CF$_3$.
49. The compound of any one of embodiments 41-48, wherein $R_3$ and $R_4$ are H.
50. The compound of any one of embodiments 41-48, wherein $R_3$ and $R_4$ are F.
51. The compound of any one of embodiments 41-50, wherein $R_7$ is H.
52. The compound of any one of embodiments 41-50, wherein $R_7$ is CH$_3$.
53. The compound of any one of embodiments 41-52, wherein X and Y are H.
54. The compound of any one of embodiments 41-52, wherein X and Y are F.
55. The compound of any one of embodiments 41-54, wherein m is 2.
56. The compound of any one of embodiments 41-55, wherein n is 3.
57. The compound of any one of embodiments 41-55, wherein n is 4.
58. The compound of any one of embodiments 41-57, wherein A is

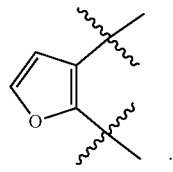 [SMILES: *c1ccoc1*]

59. The compound of any one of embodiments 41-57, wherein A is

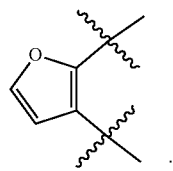 [SMILES: *c1ccoc1*]

60. The compound of any one of embodiments 41-57, wherein A is

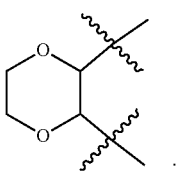 [SMILES: *C1OCCOC1*]

61. A compound having the formula:

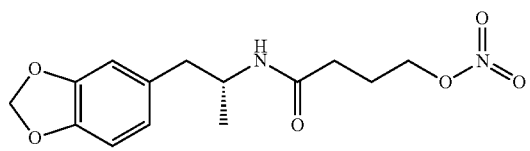 [SMILES: C[C@H](Cc1ccc2c(c1)OCO2)NC(=O)CCCO[N+](=O)[O-]]

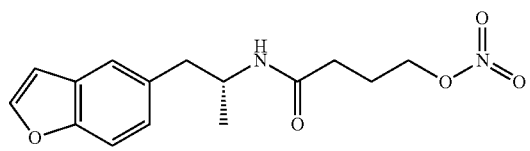 [SMILES: C[C@H](Cc1ccc2occc2c1)NC(=O)CCCO[N+](=O)[O-]]

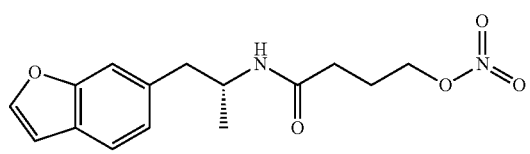 [SMILES: C[C@H](Cc1ccc2ccoc2c1)NC(=O)CCCO[N+](=O)[O-]]

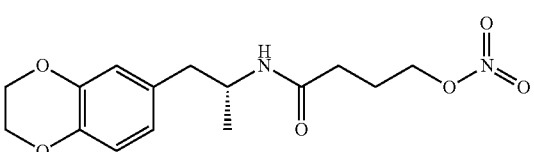

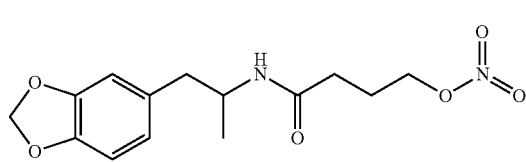 [SMILES: CC(Cc1ccc2c(c1)OCO2)NC(=O)CCCO[N+](=O)[O-]]

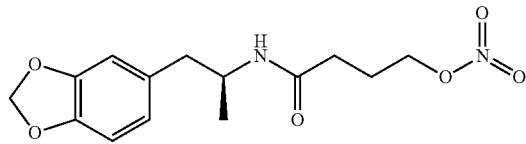 [SMILES: C[C@@H](Cc1ccc2c(c1)OCO2)NC(=O)CCCO[N+](=O)[O-]]

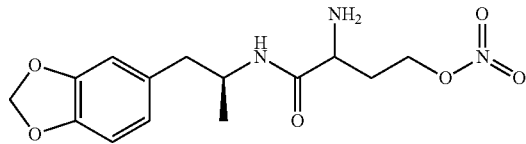 [SMILES: C[C@@H](Cc1ccc2c(c1)OCO2)NC(=O)C(N)CCO[N+](=O)[O-]]

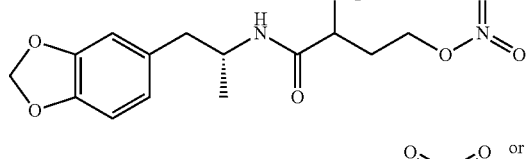

or

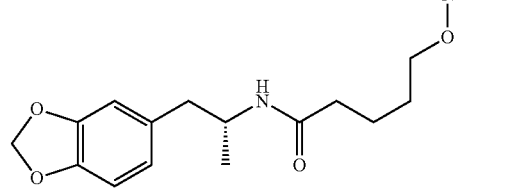

-continued

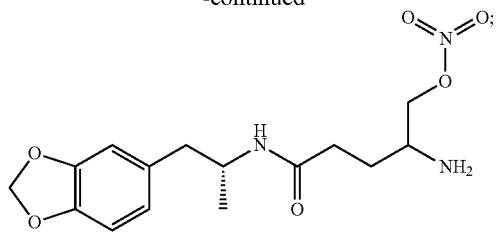

or a pharmaceutically acceptable salt thereof.

62. A pharmaceutical composition, comprising a compound of any one of embodiments 1-61 and a pharmaceutically acceptable excipient.

63. A method of treating a mental health disease or disorder, the method comprising administering a therapeutically effective amount of a compound of any one of embodiments 1-61 or the pharmaceutical composition of embodiment 62.

EXAMPLES

Example 1: Methods of Preparing the Compounds of the Present Disclosure

The following schemes provide methods for preparing the compounds of the present disclosure.

Unless otherwise noted, all materials/reagents were obtained from commercial suppliers and used without further purification. Reactions were monitored by LC-MS and/or thin layer chromatography (TLC) on silica gel 60 F254 (0.2 mm) pre-coated aluminum foil or glass-backed and visualized using UV light. $^1$HNMR (400 MHZ) spectra was recorded on Broker spectrometers at RT with TMS or the residual solvent peak as the internal standard. Chemical shifts are given in (δ) and the coupling constants (J) are given as absolute values in Hertz (Hz). The multiplicities in $^1$HNMR spectra are abbreviated as follows: s (singlet), d (doublet), t (triplet), q (quartet), m (multiplet), br or broad (broadened). Preparative HPLC purifications were performed on Shimadzu LC-6AD. All purification work was completed using a Shim-pack PREP-DDS (H) KIT Column. The mobile phases were water (with 0.1% HCO$_2$H) and acetonitrile; all reagents used were of HPLC grade. The flow rate was 10 ml/min. LC-MS analyses were performed on Shimadzu LCMS-2020 equipped with LC-20AD or 30AD pumps, SPD-M20A PDA and Alltech 3300 ELSD; Mobile Phase: A: Water (0.1% Formic acid), B: ACN; 5 minute run; Column: Sepax BR-C18 4.6*50 mm, 3 μm; Flow Rate: 1.0 ml/min; Oven Temperature: 40° C.; Gradient: 20% B for 0.2 min, increase to 70% B within 1.8 min, 70% B for 2.8 min, back to 20% B within 0.2 min, 20% B for 2 min). Preparative TLC was performed on Whatman LK6F Silica Gel 60A size 20×20 cm plates with a thickness of 1000 μm or equivalent.

Method a for Preparing Compounds of the Present Disclosure, e.g., Formula 1-1, 1-2,1-3, 1-5, 1-6, 1-7 and 1-8

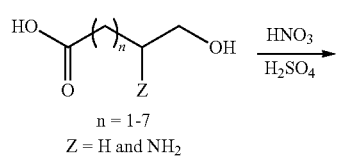

n = 1-7
Z = H and NH$_2$

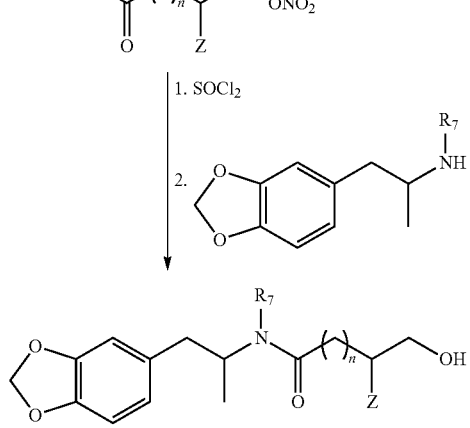

Example 2: Synthesis of 2-1: (R)-4-((1-(benzo[d][1,3]dioxol-5-yl)propan-2-yl)amino)-4-Oxobutyl Nitrate Intermediate 2-14 was synthesized from commercially available intermediate 2-1-A (Scheme 1) and was used for the final pro drig synthesis (Scheme 2).

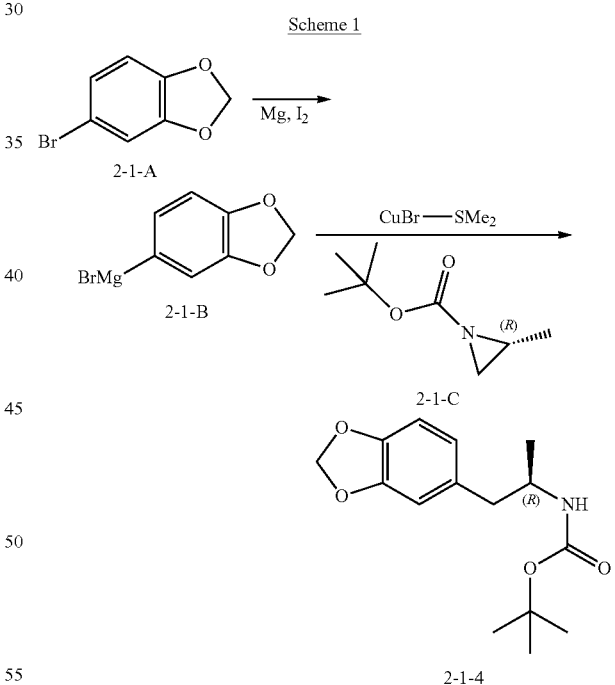

Synthesis of Intermediate 2-1-B

To a 100 mL flask was charged magnesium (60.4 mg, 2.487 mmol, 2.00 equiv.), iodine (one crystal) and tetrahydrofuran (1.5 mL) at room temperature under nitrogen. 5-Bromo-2H-1,3-benzodioxole, 2-1-A (50 mg) was added to the mixture and heated to 50° C. at which time the iodine color disappeared, and the internal temperature rose to 56° C. 5-Bromo-2H-1,3-benzodioxole (450 mg, total added 500 mg, 2.487 mmol, 2.0 equiv.) was added, via syringe, to the mixture dropwise maintaining an internal temperature of 45-55° C. over 10 minutes. After addition was complete the syringe was rinsed with THF (0.1 mL) and the rinse charged to the reaction at 49° C. After stirring for 1.5 hours the batch was a clear amber color with an internal temperature of 19.6° C. THF (1 mL) was added. This crude material 2-1-B was used directly for the next steps.

Synthesis of Intermediate 2-1-4

The flask was cooled to 0.8° C. using an ice/water bath then solid CuBr•SMe2 (52.3 mg, 0.254 mmol, 0.2 equiv) was charged in one portion. An exotherm to 6° C. was observed. After cooling to 0.5° C. a solution of tert-butyl (2R)-2-methylaziridine-1-carboxylate, 2-1-C (200 mg, 1.272 mmol, 1.0 equiv.) in tetrahydrofuran (0.5 mL) was added over 20 minutes, while maintaining an internal temperature <6° C. After stirring for 4 hours TLC analysis (5:1 heptane/EA) of the brown slurry showed complete reaction. After a further 20 minutes the reaction was quenched with dropwise addition sat. ammonium chloride (5.0 mL), while maintaining an internal temperature <18° C. (3 minutes).

After stirring for 12 minutes at room temperature the biphasic mixture was diluted with Ethyl acetate (1.5 mL). The layers were separated, and the aqueous layer was extracted with Ethyl acetate (2×1.5 mL). The combined organic layers dried over sodium sulfate (1.3 g), filtered, and concentrated under reduced pressure. Chromatographic purification in silica, eluting with 0-15% Ethyl acetate/heptane afforded tert-butyl (R)-(1-(benzo[d][1,3]dioxol-5-yl) propan-2-yl) carbamate, 2-1-4 (130 mg, 36% yield) as a white solid. 50 mg purified by reversed Flash with the following conditions: Column: XBridge Prep OBD C18 Column, 30*150 mm, 5 μm; Mobile Phase A: 10 mmol $NH_4HCO_3$+0.05% $NH_3H_2O$, Mobile Phase B: ACN; Flow rate: 60 mL/min; Gradient: 23% B to 53% B in 8 min, 53% B; Wavelength: 254 nm. The fractions of desired product were lyophilized. This resulted in 28.0 mg as a white solid. MS m/z [M−H]⁻ (ESI): 278.15. $^1$H NMR (400 MHZ, DMSO-$d_6$) δ 6.81-6.61 (m, 4H), 5.95-5.94 (m, 2H), 3.61-3.53 (m, 1H), 2.63-2.58 (m, 1H), 2.49-2.44 (m, 1H), 1.34 (s, 9H), 0.98 (d, J=6.8 Hz, 3H).

Synthesis of intermediate 2-1: tert-butyl (R)-(1-(benzo[d][1,3]dioxol-5-yl) propan-2-yl) carbamate Scheme 2

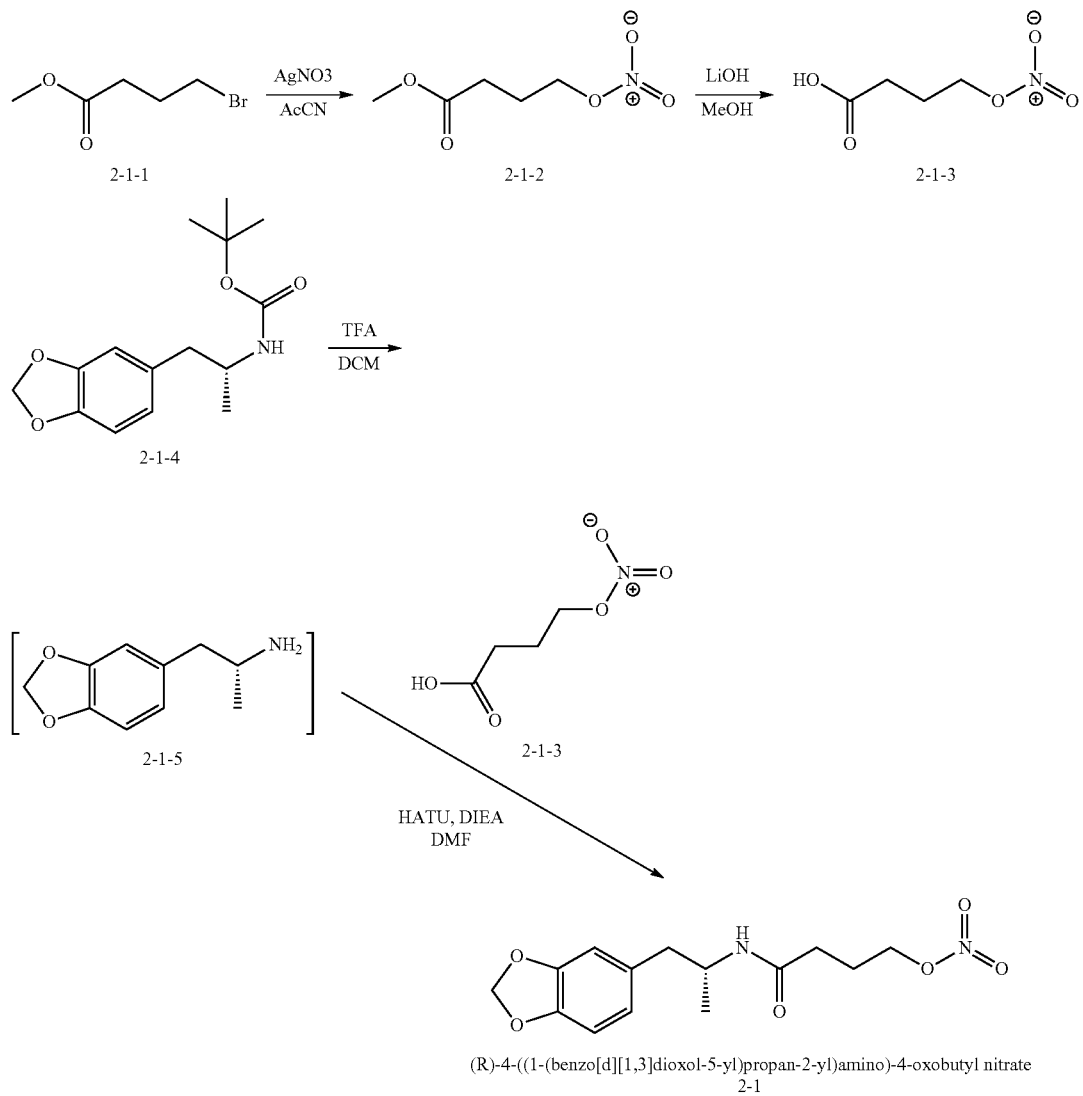

(R)-4-((1-(benzo[d][1,3]dioxol-5-yl)propan-2-yl)amino)-4-oxobutyl nitrate
2-1

Synthesis of Intermediate 2-1-2

To a solution of methyl 4-bromobutanoate, 2-1-1 (1 g, 5.56 mmol, 1 equiv.) in dry acetonitrile (20 mL) was added silver nitrate (2.35 g, 13.810 mmol, 2.5 equiv.). The reaction was heated to 80° C. for 4 hours, protected from light. The reaction mixture was filtered through Celite and the solvent removed under reduced pressure. The crude residue suspended in ethyl acetate (20 mL) and filtered through a silica plug. The organic layer was washed with water (10 mL) and brine (10 mL), dried over sodium sulfate, filtered and the solvent removed under reduced pressure to 2-1-2 (800 mg, 89%) as a pale yellow oil, which was used without any further purification.

Synthesis of Intermediate 2-1-3:4-(nitrooxy) Butanoic Acid

Methyl 4-(nitrooxy) butanoate 2-1-1 (700 mg, 4.291 mmol, 1 equiv) was dissolved in methanol (16.8 mL) at 5° C. and LiOH (4.2 mL, 2 mol/L in water) was added. The reaction was stirred overnight at 5° C. Solution was acidified to pH 3 with HCl (1 mol/L) and methanol as evaporated. Aqueous phase was extracted with DCM, dried over sodium sulfate and concentrated affording 4-(nitrooxy) butanoic acid, 2-1-3 (350 mg, 55%) as a yellow oil.

Synthesis of Final Product 2-1: (R)-4-((1-(benzo[d][1,3]dioxol-5-yl) propan-2-yl)amino)-4-Oxobutyl Nitrate To a solution of 2-1-4, tert-butyl (R)-(1-(benzo[d][1,3] dioxol-5-yl) propan-2-yl) carbamate (200 mg, 0.716 mmol, 1 equiv) in dichloromethane (3.3 mL), TFA (0.7 mL) was added. It was stirred for one hour and concentrated under reduced pressure. The residue was dissolved in DMF (4 mL), then 4-(nitrooxy) butanoic acid, 2-1-3 (117.43 mg, 0.788 mmol, 1.1 equiv), HATU (408.36 mg, 1.074 mmol, 1.5 equiv) and DIEA (277.62 mg, 2.148 mmol, 3 equiv) was added into the solution. The mixture was stirred for one hour. The residue was purified by reversed-phase flash chromatography with the following conditions: column, $C_{18}$ silica gel; mobile phase, acetonitrile in water (0.05% $NH_4HCO_3$), 20% to 50% gradient in 12 min; detector, UV 220 nm. The eluent was lyophilized. This resulted in (R)-4-((1-(benzo[d][1,3]dioxol-5-yl) propan-2-yl)amino)-4-oxobutyl nitrate, 2-1 (25.7 mg) as a white solid. MS m/z $[M+H]^+$ (ESI): 311.10. $^1$H NMR (300 MHz, Chloroform-d) δ 6.79-6.50 (m, 3H), 5.93 (s, 2H), 5.26 (s, 1H), 4.60-4.31 (m, 2H), 4.31-4.08 (m, 1H), 2.76-2.55 (m, 2H), 2.28-2.16 (m, 2H), 2.15-1.92 (m, 2H), 1.12 (d, J=6.6 Hz, 3H).

Plasma Stability of (R)-4-((1-(benzo[d][1,3]dioxol-5-yl) propan-2-yl)amino)-4-Oxobutyl Nitrate, Prodrug 2-1

TABLE 3

Stability of Prodrug 2-1 in Plasma of Different Species

| | | | Remaining Percentage (%) | | | | | |
|---|---|---|---|---|---|---|---|---|
| Compound | Species | $T_{1/2}$ (min) | 0 min | 15 min | 30 min | 60 min | 120 min | 120 min |
| Propantheline | Human | 14.78 | 100.00 | 72.22 | 39.13 | 6.46 | 0.12 | 0.12 |
| Prodrug 2-1 | | 908.64 | 100.00 | 100.94 | 102.03 | 90.66 | 93.79 | 93.79 |
| Lovastatin | Rat | 4.48 | 100.00 | 9.82 | 0.00 | 0.00 | 0.00 | 0.00 |
| Prodrug 2-1 | | 230.30 | 100.00 | 96.93 | 93.53 | 81.00 | 70.84 | 70.84 |
| Propantheline | Mouse | 26.96 | 100.00 | 72.20 | 49.21 | 22.77 | 4.69 | 4.69 |
| Prodrug 2-1 | | 1573.92 | 100.00 | 95.13 | 98.19 | 95.02 | 93.59 | 93.59 |

Propantheline and Lovastatin are reference compounds.
Scheme 3

TABLE 4

Solubility Result of 2-1 and Control Compound in FaSSIF

| Compounds | Solublity (uM) FaSSIF |
|---|---|
| Diclofenace | 285.47 |
| 2-1 | 284.33 |

Diclofenace is a reference compound

TABLE 5

Stability results of test compound and control compound in PBS pH 6.5, SGF with and without pepsin

| | | $T_{1/2}$ | Remaining Percentage (%) | | | | |
|---|---|---|---|---|---|---|---|
| Compounds | Incubation | (min) | 0 min | 30 min | 60 min | 120 min | 240 min |
| Chlorambucil | PBS (pH 6.5) | 47.72 | 100 | 62.6 | 39.9 | 15.07 | 2.05 |
| Erythromycin | SGF with pepsin | 39.82 | 100 | 59.9 | 39.02 | 12.40 | 1.57 |
| Erythromycin | SGF without pepsin | 40.25 | 100 | 60.53 | 34.86 | 11.45 | 1.64 |

TABLE 5-continued

Stability results of test compound and control compound in PBS pH 6.5, SGF with and without pepsin

| Compounds | Incubation | $T_{1/2}$ (min) | Remaining Percentage (%) | | | | |
|---|---|---|---|---|---|---|---|
| | | | 0 min | 30 min | 60 min | 120 min | 240 min |
| 2-1 | PBS (pH 6.5) | 802.89 | 100 | 104.05 | 105.81 | 98.20 | 83.83 |
| 2-1 | SGF with pepsin | 811.92 | 100 | 98.88 | 98.96 | 89.53 | 82.75 |
| 2-1 | SGF without pepsin | 858.66 | 100 | 95.42 | 99.51 | 93.54 | 81.87 |

Chlorambucil and Erythromycin are reference compounds.

The invention claimed is:

1. A method of treating social anxiety in a subject in need thereof, the method comprising administering to the subject an effective amount of a compound of Formula (I):

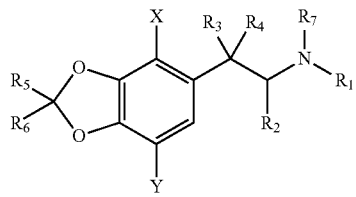

or a pharmaceutically acceptable salt thereof; wherein,
$R_1$ is —(C=O)(CR$_9$R$_9$')$_n$—ONO$_2$ or —(C=O)(CR$_9$R$_9$')$_m$—CH(NH$_2$)CH$_2$ONO$_2$;
$R_2$ is H, $C_1$-$C_4$ alkyl, or CF$_3$;
$R_3$ and $R_4$ are independently H or F;
$R_5$ and $R_6$ are independently H, $C_1$-$C_6$ alkyl, or CF$_3$;
$R_7$ is H or CH$_3$;
$R_8$ is H, $C_1$-$C_6$ alkyl, or CF$_3$;
$R_9$ and $R_9$' are independently H, halogen, or $C_1$-$C_6$ alkyl;
X and Y are independently H, F, Cl, Br, or OR$^8$,
n is an integer from 1 to 9; and
m is an integer from 1 to 9.

2. The method of claim 1, wherein $R_1$ is —(C=O)(CR$_9$R$_9$')$_n$—ONO$_2$.

3. The method of claim 1, wherein $R_1$ is —(C=O)(CR$_9$R$_9$')$_m$—CH(NH$_2$)CH$_2$ONO$_2$.

4. The method of claim 1, wherein $R_1$ is —(C=O)(CH$_2$)$_m$—CH(NH$_2$)CH$_2$ONO$_2$.

5. The method of claim 1, wherein $R_2$ is $C_1$-$C_4$ alkyl.

6. The method of claim 1, wherein $R_2$ is methyl.

7. The method of claim 1, wherein $R_2$ is CF$_3$.

8. The method of claim 1, wherein $R_3$ and $R_4$ are H.

9. The method of claim 1, wherein $R_3$ and $R_4$ are F.

10. The method of claim 1, wherein $R_5$ and $R_6$ are H.

11. The method of claim 1, wherein $R_5$ and Re are $C_1$-$C_6$ alkyl.

12. The method of claim 1, wherein $R_5$ and $R_6$ are CF$_3$.

13. The method of claim 1, wherein $R_7$ is H.

14. The method of claim 1, wherein $R_7$ is CH$_3$.

15. The method of claim 1, wherein X and Y are H.

16. The method of claim 1, wherein X and Y are F.

17. The method of claim 1, wherein m is 2.

18. The method of claim 1, wherein n is 3.

19. The method of claim 1, wherein n is 4.

20. The method of claim 1, wherein the compound has the formula:

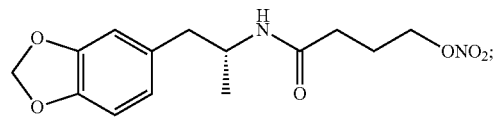

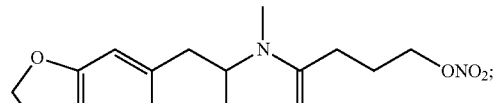

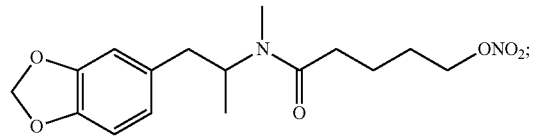

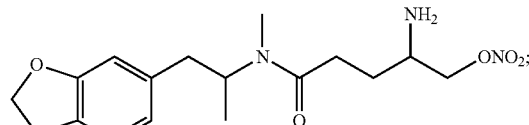

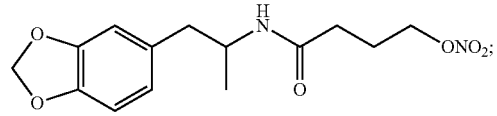

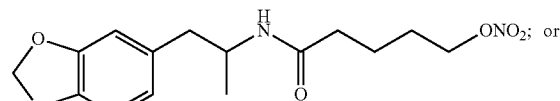

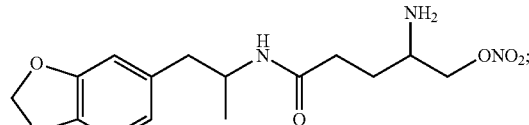

or a pharmaceutically acceptable salt thereof.

21. A method of treating social anxiety in a subject in need thereof, the method comprising administering to the subject an effective amount of a compound of Formula (II):

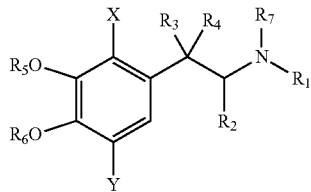

or a pharmaceutically acceptable salt thereof; wherein,
$R_1$ is —(C=O)($CR_9R_9'$)$_n$—$ONO_2$ or —(C=O)($CR_9R_9'$)$_m$—CH($NH_2$)$CH_2ONO_2$;
$R_2$ is H, $C_1$-$C_4$ alkyl or $CF_3$;
$R_3$ and $R_4$ are independently H or F;
$R_5$ and $R_6$ are independently H, $C_1$-$C_6$ alkyl, or $CF_3$;
$R_7$ is H or $CH_3$;
$R_8$ is H, $C_1$-$C_6$ alkyl, or CF;
$R_9$ and $R_9'$ are independently H, halogen, or $C_1$-$C_6$ alkyl;
X and Y are independently H, F, Cl, Br, or $OR^8$,
n is an integer from 1 to 9; and
m is an integer from 1 to 9.

22. The method of claim 21, wherein $R_1$ is —(C=O)($CR_9R_9'$)$_n$—$ONO_2$.

23. The method of claim 21, wherein $R_1$ is —(C=O)($CR_9R_9'$)$_m$—CH($NH_2$)$CH_2ONO_2$.

24. The method of claim 21, wherein $R_1$ is —(C=O)($CH_2$)$_n$—$ONO_2$.

25. The method of claim 21, wherein $R_1$ is —(C=O)($CH_2$)$_m$—CH($NH_2$)$CH_2ONO_2$.

26. The method of claim 21, wherein $R_2$ is $C_1$-$C_4$ alkyl.

27. The method of claim 21, wherein $R_2$ is methyl.

28. The method of claim 21, wherein $R_2$ is $CF_3$.

29. The method of claim 21, wherein $R_3$ and $R_4$ are H.

30. The method of claim 21, wherein $R_3$ and $R_4$ are F.

31. The method of claim 21, wherein $R_5$ and $R_6$ are H.

32. The method of claim 21, wherein $R_5$ and $R_6$ are $C_1$-$C_6$ alkyl.

33. The method of claim 21, wherein $R_5$ and $R_6$ are $CF_3$.

34. The method of claim 21, wherein $R_7$ is H.

35. The method of claim 21, wherein $R_7$ is $CH_3$.

36. The method of claim 21, wherein X and Y are H.

37. The method of claim 21, wherein X and Y are F.

38. The method of claim 21, wherein m is 2.

39. The method of claim 21, wherein n is 3.

40. The method of claim 21, wherein n is 4.

41. A method of treating social anxiety in a subject in need thereof, the method comprising administering to the subject an effective amount of a compound of Formula (III):

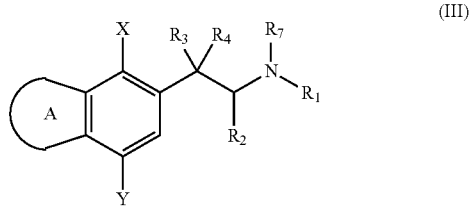

or a pharmaceutically acceptable salt thereof; wherein,

A is

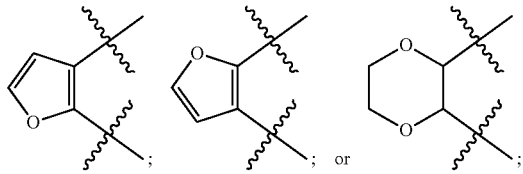 [SMILES: *c1ccoc1* ; *c1ccoc1* ; *C1OCCOC1*]

$R_1$ is —(C=O)($CR_9R_9'$)$_n$—$ONO_2$ or —(C=O)($CR_9R_9'$)$_m$—CH($NH_2$)$CH_2ONO_2$,
$R_2$ is H, $C_1$-$C_4$ alkyl or $CF_3$;
$R_3$ and $R_4$ are independently H or F;
$R_7$ is H or $CH_3$;
$R_8$ is H, $C_1$-$C_6$ alkyl, or $CF_3$;
$R_9$ and $R_9'$ are independently H, halogen, or $C_1$-$C_6$ alkyl;
X and Y are independently H, F, Cl, Br, or $OR^8$;
n is an integer from 1 to 9; and
m is an integer from 1 to 9.

42. The method of claim 41, wherein $R_1$ is —(C=O)($CR_9R_9'$)$_n$—$ONO_2$.

43. The method of claim 41, wherein $R_1$ is —(C=O)($CR_9R_9'$)$_m$—CH($NH_2$)$CH_2ONO_2$.

44. The method of claim 41, wherein $R_1$ is —(C=O)($CH_2$)$_n$—$ONO_2$.

45. The method of claim 41, wherein $R_1$ is —(C=O)($CH_2$)$_m$—CH($NH_2$)$CH_2ONO_2$.

46. The method of claim 41, wherein $R_2$ is $C_1$-$C_4$ alkyl.

47. The method of claim 41, wherein $R_2$ is methyl.

48. The method of claim 41, wherein $R_2$ is $CF_3$.

49. The method of claim 41, wherein $R_3$ and $R_4$ are H.

50. The method of claim 41, wherein $R_3$ and $R_4$ are F.

51. The method of claim 41, wherein $R_7$ is H.

52. The method of claim 41, wherein $R_7$ is $CH_3$.

53. The method of claim 41, wherein X and Y are H.

54. The method of claim 41, wherein X and Y are F.

55. The method of claim 41, wherein m is 2.

56. The method of claim 41, wherein n is 3.

57. The method of claim 41, wherein n is 4.

58. The method of claim 41, wherein A is

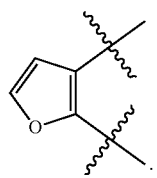 [SMILES: *c1ccoc1*]

59. The method of claim 41, wherein A is

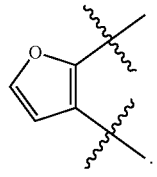 [SMILES: *c1ccoc1*]

60. The method of claim 41, wherein A is

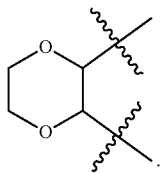

61. A method of treating social anxiety in a subject in need thereof, the method comprising administering to the subject an effective amount of a compound having the formula:

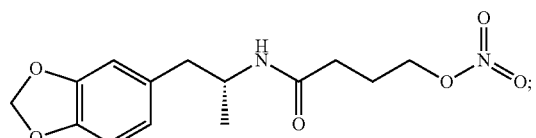

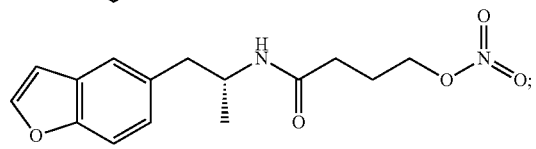

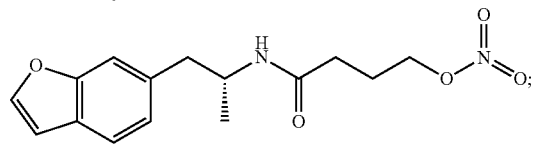

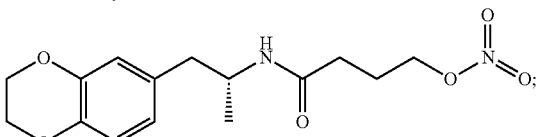

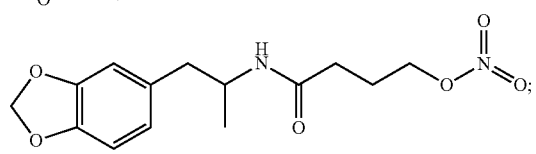

-continued

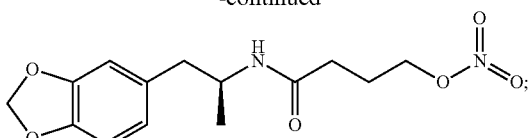

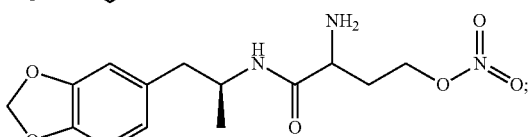

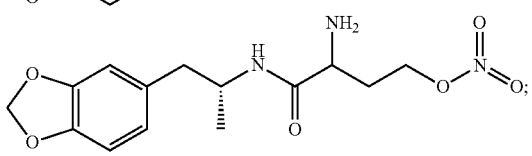

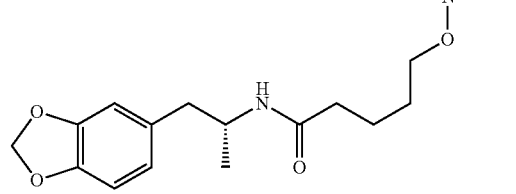

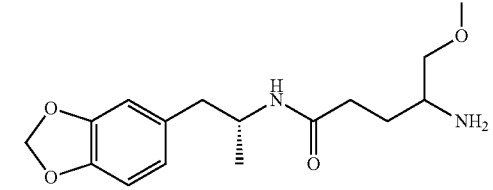

or a pharmaceutically acceptable salt thereof.

62. The method of claim 1, wherein the compound is administered to the subject in a pharmaceutical composition comprising the compound and a pharmaceutically acceptable excipient.

* * * * *